United States Patent
Ooba et al.

(10) Patent No.: US 10,506,042 B2
(45) Date of Patent: Dec. 10, 2019

(54) STORAGE SYSTEM THAT INCLUDES A PLURALITY OF ROUTING CIRCUITS AND A PLURALITY OF NODE MODULES CONNECTED THERETO

(71) Applicant: Toshiba Memory Corporation, Tokyo (JP)

(72) Inventors: Satoshi Ooba, Yokohama Kanagawa (JP); Mototaka Kanematsu, Yokohama Kanagawa (JP); Kenji Takahashi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 259 days.

(21) Appl. No.: 15/241,352

(22) Filed: Aug. 19, 2016

(65) Prior Publication Data

US 2017/0085645 A1   Mar. 23, 2017

Related U.S. Application Data

(60) Provisional application No. 62/221,821, filed on Sep. 22, 2015.

(51) Int. Cl.
| | |
|---|---|
| G06F 12/00 | (2006.01) |
| H04L 29/08 | (2006.01) |
| G06F 11/14 | (2006.01) |
| G06F 3/06 | (2006.01) |
| H04L 29/06 | (2006.01) |

(52) U.S. Cl.
CPC .......... *H04L 67/1097* (2013.01); *G06F 3/065* (2013.01); *G06F 3/067* (2013.01); *G06F 3/0619* (2013.01); *G06F 11/1464* (2013.01); *H04L 67/42* (2013.01)

(58) Field of Classification Search
CPC ........ G06F 3/0619; G06F 3/065; G06F 3/067; G06F 11/1464
See application file for complete search history.

(56) References Cited

U.S. PATENT DOCUMENTS

| | | | |
|---|---|---|---|
| 7,162,498 | B2 | 1/2007 | Nomoto et al. |
| 7,539,703 | B2 | 5/2009 | Mizuno et al. |
| 7,921,080 | B2 | 4/2011 | Taylor |
| 8,478,726 | B2 | 7/2013 | Habermann et al. |
| 8,977,598 | B2 | 3/2015 | Montulli et al. |
| 2012/0239851 | A1* | 9/2012 | Calvert ............... G06F 11/1441 711/103 |
| 2014/0122433 | A1 | 5/2014 | Murata |

(Continued)

*Primary Examiner* — Gurtej Bansal
(74) *Attorney, Agent, or Firm* — Kim & Stewart LLP

(57) ABSTRACT

A storage system includes a storage unit having a plurality of routing circuits electrically networked with each other, each of the routing circuits being locally connected to a plurality of node modules, each of which includes nonvolatile memory, the plurality of node modules forming at least first and second storage regions, and a plurality of connection units, each connected to one or more of the routing circuits, and access the first and second storage regions through one or more of the routing circuits in accordance with a command. When one of the connection units receives a command to write second data into the first storage region while first data are being read out from the first storage region, said one of the connection units writes the second data into both the first and second storage regions.

20 Claims, 17 Drawing Sheets

(56) References Cited

U.S. PATENT DOCUMENTS

2014/0136887 A1* 5/2014 Murakami .......... G06F 11/2082
714/6.32
2014/0304469 A1* 10/2014 Wu ........................ G06F 3/065
711/114

* cited by examiner

| TRANSMISSION SOURCE | ADDRESSEE | COMMAND/DATA | CRC |
|---|---|---|---|

STORAGE SYSTEM THAT INCLUDES A PLURALITY OF ROUTING CIRCUITS AND A PLURALITY OF NODE MODULES CONNECTED THERETO

CROSS-REFERENCE TO RELATED APPLICATIONS

This application is based upon and claims the benefit of priority from U.S. Provisional Patent Application No. 62/221,821, filed on Sep. 22, 2015, the entire contents of which are incorporated herein by reference.

FIELD

The following embodiments relate to a storage system, in particular, a storage system that includes a plurality of routing circuits and a plurality of node modules connected thereto.

BACKGROUND

A process to back up data stored in a storage system to another storage system is known. In the conventional art, when the data to be backed up are updated while a backup operation is being carried out, the updated data are written to a storage region separate from a main storage region that stores the data to be backed up, and after the completion of the backup operation, the updated data are overwritten into the main storage region. However, according to the conventional art, during the time when the updated data that are overwritten into the main storage region, new data cannot be written into the main storage region, and this can lead to a processing delay.

DETAILED DESCRIPTION

According to an embodiment, a storage system includes a storage unit having a plurality of routing circuits electrically networked with each other, each of the routing circuits being locally connected to a plurality of node modules, each of which includes nonvolatile memory, the plurality of node modules forming at least first and second storage regions, and a plurality of connection units, each connected to one or more of the routing circuits, and access the first and second storage regions through one or more of the routing circuits in accordance with a command. When one of the connection units receives a command to write second data into the first storage region while first data are being read out from the first storage region, said one of the connection units writes the second data into both the first and second storage regions.

Figure 1:
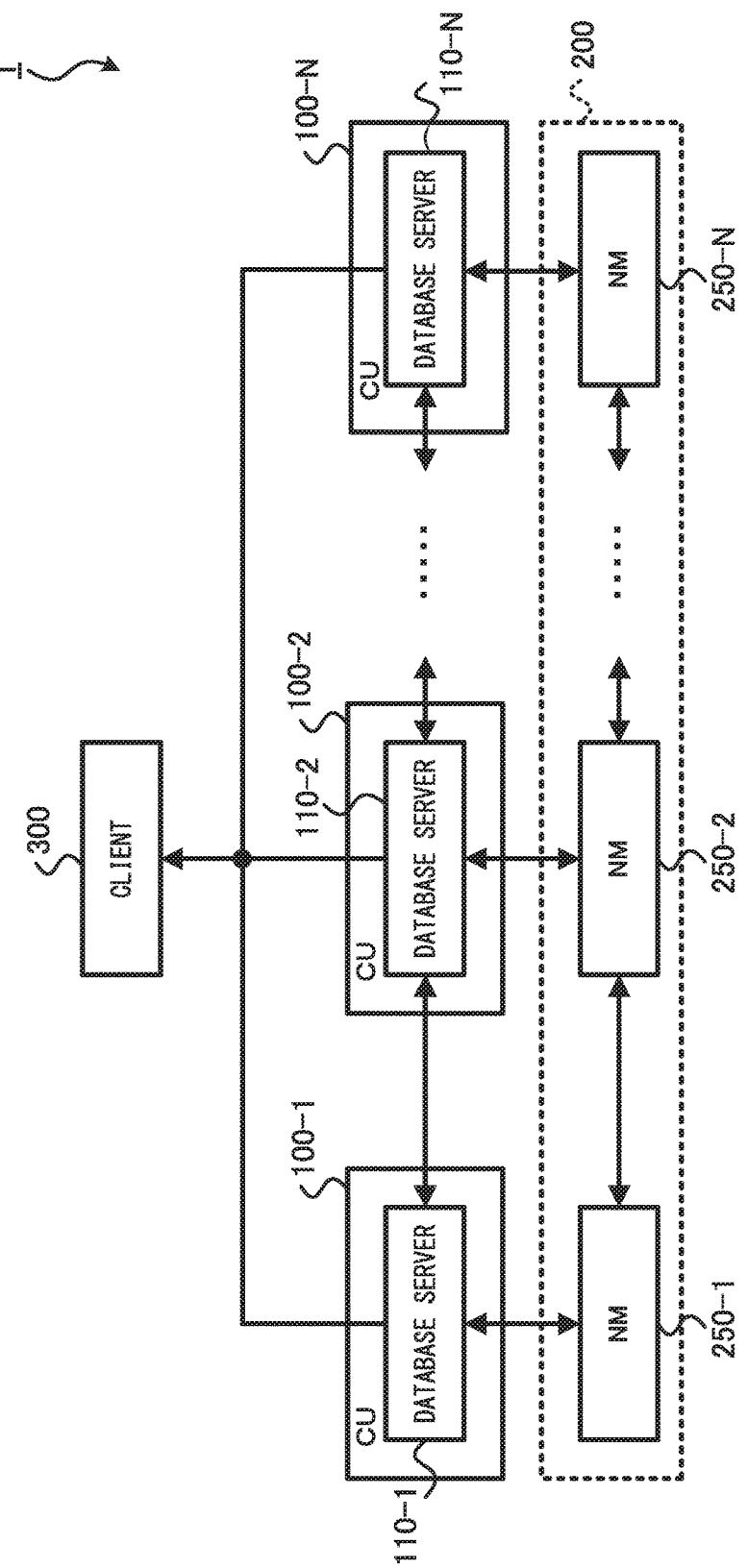
FIG. 1 shows a configuration of a storage system according to an embodiment.

In the following, a storage system 1 according to an embodiment will be described with reference to the drawings. FIG. 1 shows a configuration of the storage system 1 according to the embodiment. The storage system 1 includes a plurality of connection units (CUs) 100-1, 100-2, ..., 100-N, and a plurality of node modules (NMs) 250-1, 250-2, ..., 250-N, where N is an arbitrary natural number. In the description below, when no distinction is made between one connection unit and another connection unit, they are both described as a connection unit 100, and when no distinction is made between one node module and other node modules, they are both describe as a node module 250.

Each of the connection units 100 is connected to the client 300 via a network. Although the storage system 1 shown in FIG. 1 includes single client 300, the storage system 1 may include a plurality of clients 300.

Each of the connection units 100 communicates with the client 300 in accordance with, for example, TCP (Transmission Control Protocol)/IP (Internet Protocol), or SCTP (Stream Control Transmission Protocol).

Each of the connection unit 100 is connected to a node module 250 via an interface. Each of the connection units 100 and the corresponding node module 250 perform data communication in accordance with, for example PCI Express (PCIe). Each of the connection units 100 includes a database server 110 as a functional element. The database server 110 (which may be, e.g., a storage controller) is implemented by, for example, a processor such as a CPU executing a program stored in the connection unit 100. The database server 110 may also be implemented in hardware, such as an LSI (large-scale integration) device, an ASIC (application-specific integrated circuit) or an FPGA (field-programmable gate array) having the same function as execution of the program.

When the database server 110 receives a request transmitted from the client 300, the database server 110 controls the corresponding node module 250. Requests transmitted to the database server 110 from the client 300 include backup requests, data write requests, and data read requests. Although a backup request is one example of a data processing request, processing requested from the client 300 is not limited to backup requests.

When the database server 110 receives a backup request transmitted from the client 300, the database server 110 executes backup processing. Backup requests and backup processing will be described below. When the database server 110 receives a write request transmitted from the client 300, the database server 110 stores the write data, which are requested to be written in accordance with the write request transmitted from the client 300, into the node module 250. The write request includes a logical address of a node module 250 in which the write data are to be written. The logical address may be arbitrary key information or address information applied as sequential information.

When the database server 110 receives a read request transmitted from the client 300, the database server 110 reads data (read data) stored in the node module 250 and requested through the read request and transmits the read data to the client 300. The read request includes a logical address of a node module 250 from which the data are to be read.

The node module 250 is connected to the connection unit 100 through an interface. The node module 250 stores data in accordance with requests from the connection unit 100, such as a write request. The node module 250 reads stored data and outputs the read data to the connection unit 100, in accordance with requests from the connection unit 100, such as a read request.

Figure 2:
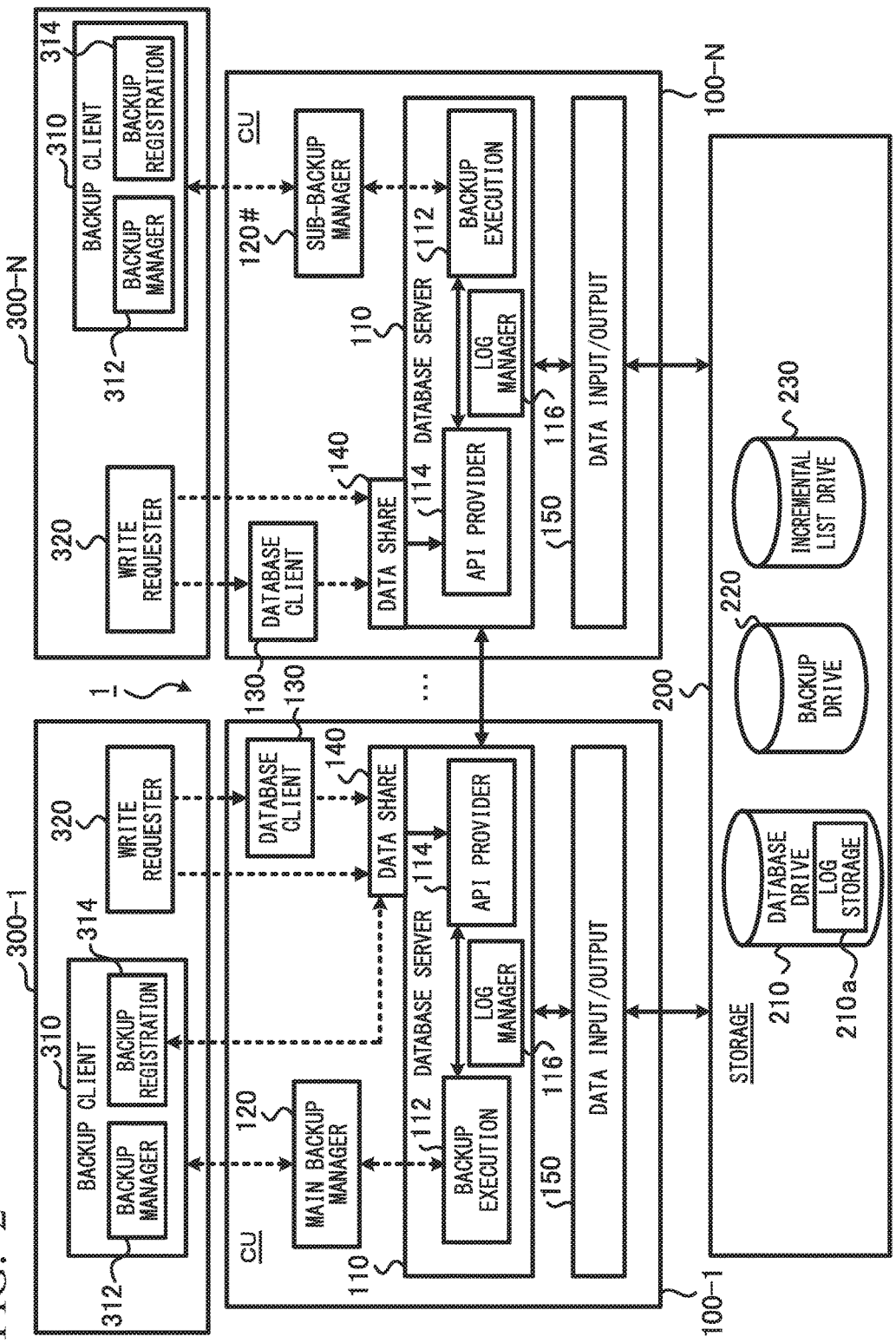
FIG. 2 is a block diagram showing a functional configuration of the storage system according to the embodiment.

FIG. 2 is a more detailed block diagram of the storage system 1 according to the present embodiment. In FIG. 2, a plurality of clients 300-1 to 300-N is connected to connection units 100-1 to 100-N, respectively. In the description below, when no distinction is made between one client and other clients, they are both described as a client 300.

In the storage system 1 according to the present embodiment, a storage 200 that stores data in a single address space is formed by the plurality of node modules 250 mutually communicating with each other.

In the storage 200, unique logical addresses are assigned to physical data storage regions of the plurality of node modules 250, and thus the storage 200 forms a single logical address space. Storage is memory in which data can be overwritten and in which data are held even if the power of the storage system 1 is switched off. Additionally, storage is memory into which data are written in accordance with instructions from the client 300. The storage 200 includes, for example, a database drive 210, a backup drive 220, and an incremental list drive 230. The database drive 210, the backup drive 220, and the incremental list drive 230 are sectored by the assignment of logical addresses in the logical address space. Here, "sectored" means the allocation of logical addresses that belong to regions handled by each connection unit 100 for writing and reading of data.

The database drive 210 stores data that can be written, read, changed (updated), or deleted by the client 300. The database drive 210 stores data in units of a table, in which a plurality of data units are associated or in units of a record. The database driver 210, for example, functions as a key-value database, in which keys and values (data) are associated with each other under control of the backup execution 112. In this case, if a request that designates a key is output by the database server 110, the physical address of the value (data) corresponding to the key is identified, and processing such as writing and reading is performed. The database drive 210 may store logical addresses allocated as sequential information in association with the corresponding data.

The database drive 210 includes a log storage 210*a* which stores a transaction log as log information. The transaction log is information that identifies a transaction carried out by the corresponding connection unit 100 and transaction contents. The transaction log identifies a history of write requests. The history of write requests includes, for example, transaction identification information and information regarding the beginning and end of a transaction or information regarding the data that was the subject of the transaction, which are stored in association with each other. A transaction is a unit representing a series of processing of information as a single task. The transaction log, for example, may be the write history of actual write operations of the storage 200 executed in response to write requests, or a recorded table of information processing included in write requests, regardless of whether writing was actually done.

The log storage 210*a* is sectored in the database drive 210 by the data storage region and logical addresses.

The backup drive 220 stores backup data of the data that are stored in the database drive 210 and have been changed therein. A region such as the log storage 210*a* formed in the database drive 210 is not formed in the backup drive 220.

The incremental list drive 230 stores an incremental list, which enables the changed data in the database drive 210 to be read out. The incremental list, for example, is a list of management information for identifying write data, such as the logical address or name of the locations of the changed data. The incremental list is, for example, a list of keys corresponding to the changed data if the storage 200 functions as a key-value type database.

The client 300 includes a backup client 310 and a write requester 320. The backup client 310 and the write requester 320, for example, are implemented by a processor such as a CPU executing a program stored in the client 300. The backup client 310 includes, for example, a backup manager 312 and a backup registration unit 314.

The backup manager 312 manages transmission of a request (backup request) for backup processing of data corresponding to the client 300. Backup processing is processing of reading out data to be backed up from the database drive 210 and transmitting the read-out data to the client 300. Backup processing may include, in addition to the processing of transmitting the read-out data to the client 300, processing of writing the read-out data into another storage device for backup.

The data to be backed up are different, depending upon whether the type of backup processing is a full backup or an incremental backup. The full backup is processing of backing up all data of the database drive 210. The incremental backup is processing of backing up, among data stored in the database drive 210, differential data which have been changed since the immediately previous backup processing. When the type of backup processing is the full backup, the data to be backed up are all data of the database drive 210. When the type of backup processing is the incremental backup, the data to be backed up are the data that are stored in the database drive 210 and have been changed since the immediately previous backup processing.

The backup manager 312, for example, by either a backup processing schedule or an operation made by a user, transmits to the connection unit 100 a backup request that requests execution of backup processing. The backup registration 314 transmits information designating the type of data to be backed up, to the connection unit 100.

The write requester 320, for example, is implemented by a CPU or the like executing an application program stored in the client 300. The write requester 320 performs processing to issue a write request to write new data into the database drive 210 of the storage 200 and transmits the data write request. The write requester 320 includes the write data and logical address in the data transmitted as the write request.

The connection unit 100 includes, for example, a database server 110, a main backup manager 120, a database client 130, a data sharing unit 140, and a data input/output unit 150. The database server 110, the main backup manager 120, the database client 130, and the data sharing unit 140 are implemented, for example, by a CPU or the like executing a program. The data input/output unit 150 is implemented, for example, by a CPU or the like executing firmware for controlling the node module 250.

The database server 110 manages a database that is built in the storage 200. The database server 110 includes a backup execution unit 112, an API (application programming interface) provider 114, and a log manager 116.

The backup execution unit 112, in accordance with a backup request transmitted by the main backup manager 120, sends a read request to the API provider 114 by making a function call, so as to read out data stored in the storage 200 and transmit the data to the client 300. The backup execution unit 112 sends a write request to the API provider 114 by making a function call, and causes the storage 200 to store data requested to be written through the write request from the client 300. The backup execution unit 112 sends a deletion request to the API provider 114 by making a function call, and causes the corresponding data to be erased from the storage 200.

The API provider 114, in accordance with a read request from the data sharing unit 140 or the backup execution unit 112, reads out data stored in the database drive 210. The API provider 114, in accordance with the write request from the data sharing unit 140 or the backup execution unit 112, stores data and the like into the database drive 210, the backup drive 220, and the incremental list drive 230. The API provider 114, in accordance with a deletion request from the data sharing unit 140 or the backup execution unit 112, deletes data and the like stored in the database drive 210, the backup drive 220, and the incremental list drive 230.

The log manager 116 generates a transaction log regarding backup processing and stores the transaction log in the log storage unit 201a of the database drive 210.

The data input/output unit 150, in accordance with control signals from the API provider 114, sends data to the storage 200 and cause the data and the like to be stored in the storage 200. The data input/output unit 150, in accordance with control signals from the API provider 114, reads out data and the like stored in the storage 200 and sends the data to the API provider 114. The data input/output unit 150, in accordance with control signals from the API provider 114, deletes data and the like stored in the storage 200.

The main backup manager 120 receives a backup request transmitted from the backup client 310. The main backup manager 120, based on the received backup request, causes the database server 110 to read out data to be backed up. The main backup manager 120 transmits the data read out by the database server 110 to the backup client 310 and other backup destinations. The backup destinations include one of a transmission destination and a backup destination.

The main backup manager 120 communicates via a communication line with a sub-backup manager 120# in another connection unit 100-N. The main backup manager 120, by communication with its own database server 110 and the database server 110 of a connection unit 100 to which the sub-backup manager 120# belongs, provides information of the client 300 and a list of data to be backed up by each of the connection units 100, to the sub-backup manager 120#. That is, the main backup manager 120 cooperates with the sub-backup manager 120# to cause the database servers 110 of a plurality of connection units 110 to execute the backup processing.

The database client 130 functions as a client with respect to the corresponding database server 110. The database client 130 transmits to the data sharing unit 140 information to operate the database stored in the database drive 210. The database client 130 receives write data transmitted by the write requester 320 along with the information to operate the database. The database client 130 transmits the write data to the data sharing unit 140.

The data sharing unit 140 receives the write data transmitted by the database client 130 and, by making a function call, outputs the write data to the API provider 114 of the database server 110.

(Storage Unit)

Figure 3:
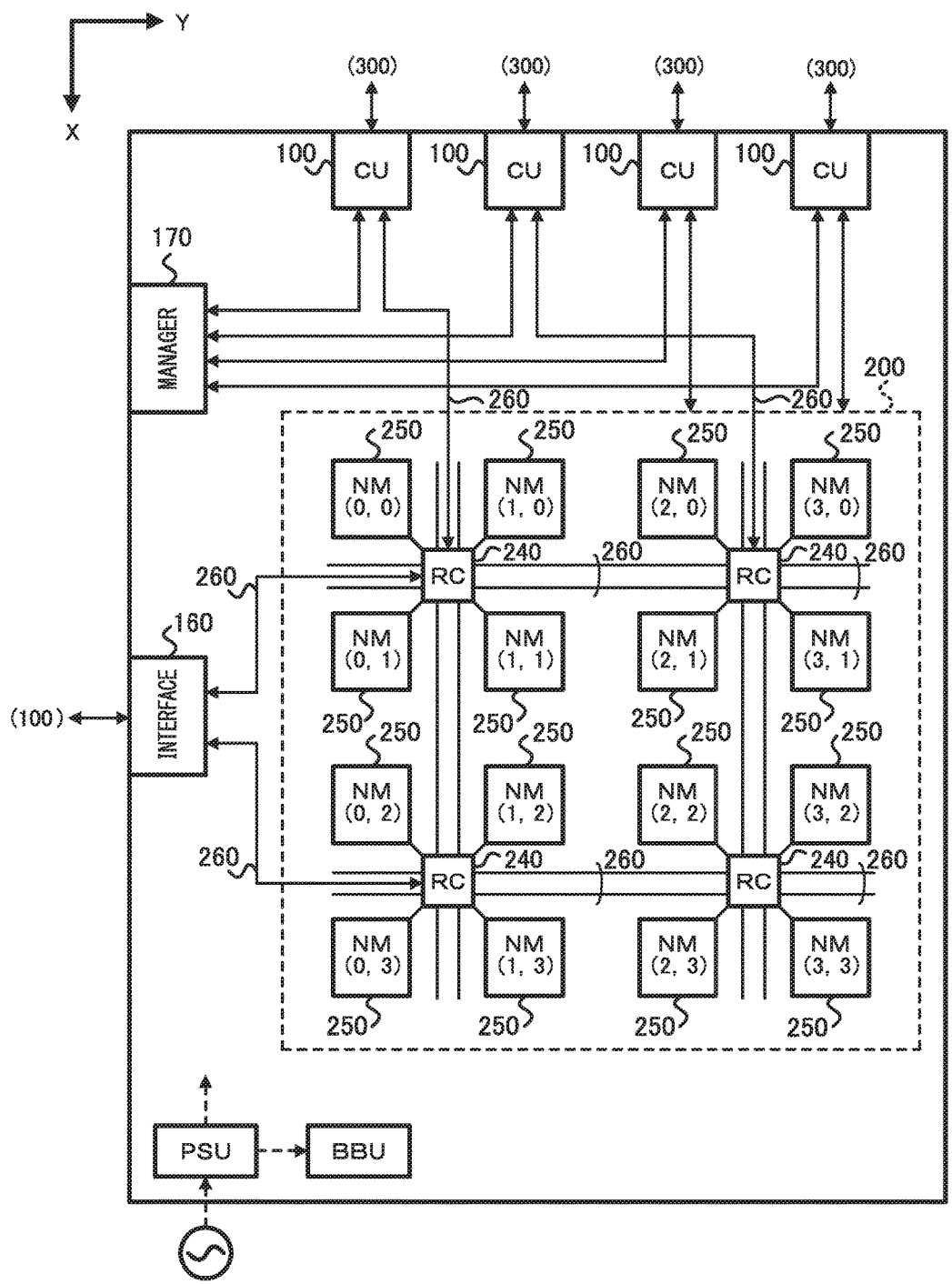
FIG. 3 is a block diagram showing a configuration of a structure that includes connection units (CUs) and storage units in the storage system according to the embodiment.

FIG. 3 is a block diagram showing a structure that includes connection units and storage in the storage system 1 according to the present embodiment. The storage system 1 according to the present embodiment includes storage 200, connection units 100, an interface 160, a manager 170, a power supply unit PSU, and an auxiliary power supply apparatus BBU.

The storage 200 of the present embodiment will be described below. The storage 200 includes a plurality of routing circuits (RCs) 241 disposed in a matrix arrangement and node modules (NMs) 250. The matrix arrangement is an arrangement in which elements thereof are lined up in a first direction and a second direction that intersects with the first direction. The storage 200 stores data in the plurality of node modules 250 in a distributed manner, and processes data in a distributed and parallel manner.

The routing circuits 240, by a mesh network, transfer packets including data transferred from a connection unit 100 or another routing circuit 240 in accordance with a prescribed protocol. The routing circuit 240 transfers data from the database server 110 to a position identical to the address of the storage 200. A torus routing (described below) is a form that can be adopted when the node modules 250 are connected in the form of a torus. In this case, compared to the case in which the node modules 250 are not connected in the form of torus, the routing circuit 240 can use a lower hierarchal level in an OSI reference model. Each routing circuit 240 includes at least two interfaces 260. The routing circuit 240 is mutually electrically connected to a neighboring routing circuit 240 via an interface 260. Details of the routing circuit 240 will be described below.

The node modules (storage units) 250 are mutually electrically connected to neighboring node modules 250 via a routing circuit 240 and a packet management unit (PMU, not shown).

FIG. 3 shows an example of a rectangularly configured network, in which each node module 250 is disposed at a matrix point. Here, the coordinates (x, y) of the matrix points are indicated in decimal notation. Position information of a node module 250 disposed at a matrix point is indicated by a relative node address $(x_D, y_D)$ (in decimal notation) corresponding to the coordinates of that matrix point. In FIG. 3, the node module 250 located in the upper-left corner has the origin node address of (0, 0). The relative node addresses of each of the node modules 250 increase and decrease according to the change in the integer values in the horizontal direction (X direction) and the vertical direction (Y direction).

Each node module 250 is connected to node modules 250 that neighbor therewith in at least two different directions. For example, the node module 250 (0, 0) in the extreme upper-left corner, via a routing circuit 240, is connected to the node module 250 (1, 0) neighboring in the X direction, to the node module 250 (0, 1) neighboring in the Y direction, which is different from the X direction, and to the node module 250 (1, 1) neighboring in the inclined direction. In the following, a node module 250 expressed by the relative node address ($x_D$, $y_D$) might be represented simply as the node ($x_D$, $y_D$).

Although the node modules 250 are disposed at matrix points of a rectangular matrix in FIG. 3, the arrangement of the node modules 250 is not restricted to the one shown in FIG. 3. That is, it is sufficient that the matrix be a connection of node modules 250 neighboring in two more different directions, and this can be, for example, triangular, hexagonal, or the like. Also, although the node modules 250 are disposed in two dimensions in FIG. 3, the node modules 250 can be disposed in three dimensions. When a three-dimensional arrangement is employed, each node module 250 may be specified by the three values (x, y, z). When the node modules 250 are disposed in two dimensions, a torus connection can be formed by joining node modules 250 with those at opposite side, in a wraparound manner. The torus configuration is a connection configuration in which the node modules 250 are connected in a circulating manner, so that there are at least two paths of connection from a given node module 250 to another node module 250, a path in a first direction and a second path opposite to that of the first path. Details of the storage 200 will be described below.

(Connection Unit (CU))

The connection unit 100 according to the present embodiment will be described below. The connection unit 100 includes a connector that is connectable to the client 300. When the connection unit 100 receives a request (command, address, or the like) transmitted by the client 300 or by another connection unit 100, the connection unit 100 operates to store data in the storage 200 and output data read out from the storage 200 to the client 300 or another connection unit 100. The connection unit 100 includes a processor and a storage device. The processor of the connection unit 100 executes a server application program, using the storage device as a working area.

The connection unit 100, under control in accordance with a server application program, processes requests transmitted by the client 300 or another connection unit 100. During the course of processing the requests, the connection unit 100 accesses the storage 200. When the connection unit 100 accesses the storage 200, the connection unit 100 generates a packet that can be transferred or executed by the routing circuit 240, and transmits the generated packet to a routing circuit 240 connected thereto.

In FIG. 3, the storage system 1 includes four connection units 100. Each of the four connection units 100 is connected to different one of the routing circuits 240. For simplicity, the connections to the different routing circuits 240 from the first two connection units 100 are shown in FIG. 3, but not from the other two connection units 100.

The number of connection units 100 can be determined arbitrarily. A connection unit 100 can be connected to an arbitrary routing circuit 240 of the storage 200. One connection unit 100 may be connected to a plurality of routing circuits 240, and one routing circuit 240 may be connected to a plurality of connection units 100. A connection unit 100 may be connected to an arbitrary routing circuit 240 of the plurality of routing circuit 240 of the storage 200. Details of the connection unit 100 will be described below.

(Interface Unit)

The interface 160 according to the present embodiment will be described below. The interface 160 is disposed for the purpose of expanding the storage 200. For example, two physically discrete storage systems 1 can be electrically connected to each other via the interface 160. By establishing this connection, the storage units 200 of the storage systems 1 are logically coupled and can be used as a single storage 200. The interface 160 is electrically connected through the interfaces 260 to one or more routing circuits 240. In this case, each interface 260 connected to two routing circuits 240 is connected, respectively, to the interface 160.

(Manager)

The manager 170 according to the present embodiment will be described below. The manager 170 is electrically connected to each connection unit 100 and to the node modules through the routing circuits 240, and configures the node modules as a RAID (redundant array of inexpensive disks). The manager 170 includes a controller, e.g., base management controller (BMC) (not illustrated). As a part of the BMC functionality, the manager 170 carries out, for example, monitoring of the ambient temperature, monitoring and control of the rpm of a fan, monitoring and control of the power supply current and the power supply voltage, recording of the status of each connection unit 100, monitoring of the temperature of each connection unit 100, and resetting of the connection units 100.

In addition to the BMC functionality, the manager 170 may carry out processing (node module control processing) with respect to the storage 200. For example, when the first memory 254 (described below) is a NAND-type flash memory, the manager 170 may execute wear leveling and garbage collection or the like with respect to the first memory 254.

Wear-leveling is an operation carried out so that the number of overwrites is uniformly distributed between memory elements. Garbage collection is an operation to transfer data other than invalid data to one or more other physical blocks, so that a physical block from which the invalid are transferred can be used after data in the physical block are erased. Invalid data are data that are not associated with a logical address.

When a failure has been discovered in a node module 250, the manager 170 may operate to send a notification of the replacement of a card on which the failed node module 250 is mounted, to an external device via a connection unit 100. After the card is replaced, the manager 170 reconfigures the RAID (redundant array of inexpensive disks).

The failure of a node module 250 may be detected by a node controller (NC) 252 (shown in FIG. 6 and described below) or a connection unit 100. The failure of a node module 250 may be detected based on detection of errors in data read from the first memory 254 (shown in FIG. 6) of that node module 250. When performing processing with respect to the storage 200, the manager 170 outputs a packet corresponding to that processing. The manager 170, for example, outputs data to which a header conforming to the format shown in FIG. 7 (described below) is appended.

(Power Supply Unit (PSU))

The power supply unit according to the present embodiment will be described below. The power supply unit (main power source) PSU converts an external power supply voltage applied from an external power source VC to a power supply voltage VCO of a prescribed DC voltage, and supplies the power supply voltage VCO to elements (100, 200, 160, and 170) of the storage system. The external power supply VC is, for example, AC 100-V or 200-V. The storage system 1 of the present embodiment includes two power supply units PSU-1 and PSU-2 (not shown). However, the configuration of the power supply units PSU is not limited thereto.

(Auxiliary Power Supply Apparatus (BBU))

The auxiliary power supply apparatus BBU according to the embodiment will be described below. The auxiliary power supply apparatus BBU according to the present embodiment (e.g., battery backup unit) is itself charged by receiving the power supply voltage VCO from the power supply unit PSU. When the storage system 1 is electrically cut off from the external power source VC, the auxiliary power supply apparatus BBU acts as an auxiliary power source to supply a prescribed auxiliary power supply voltage to the elements (100, 200, 160, and 170). For example, the auxiliary power supply apparatus BBU supplies each of the elements (100, 200, 160, and 170) with an auxiliary power supply voltage, causing the storage 200 to operate, even when a power outage or the like causes the supply of the power supply voltage from the external power source VC to stop. The node controller (NC) 252 (not shown) of the node module 250, using the supplied auxiliary power supply voltage, copies data stored in the database drive 210 into the first memory 254, so that backup is performed.

(Interface Standards)

The interface standards in the storage system according to the present embodiment will be described below. In the present embodiment, an interface to electrically connect the elements (100, 200, 160, and 170) can be a standard described below.

First, a low-voltage differential signaling standard (LVDS) or the like is employed for the interface 260 that mutually connects routing circuits 240.

The PCIe (PCI Express) standard or the like is employed for the interface 260 that electrically connects the routing circuits 240 and the connection modules 100.

LVDS and JTAG (Joint Test Action Group) standard or the like are employed for the interface 260 that electrically connects the routing circuits 240 and the interface 160.

PCIe standard and I2C (Inter-integrated Circuit) standard are employed for the interface 260 that electrically connects the node modules 250 and the manager 170.

These interface standards are examples and, as necessary, other interface standards may, of course, be applied.

(Detailed Configuration of Storage)

Figure 4:
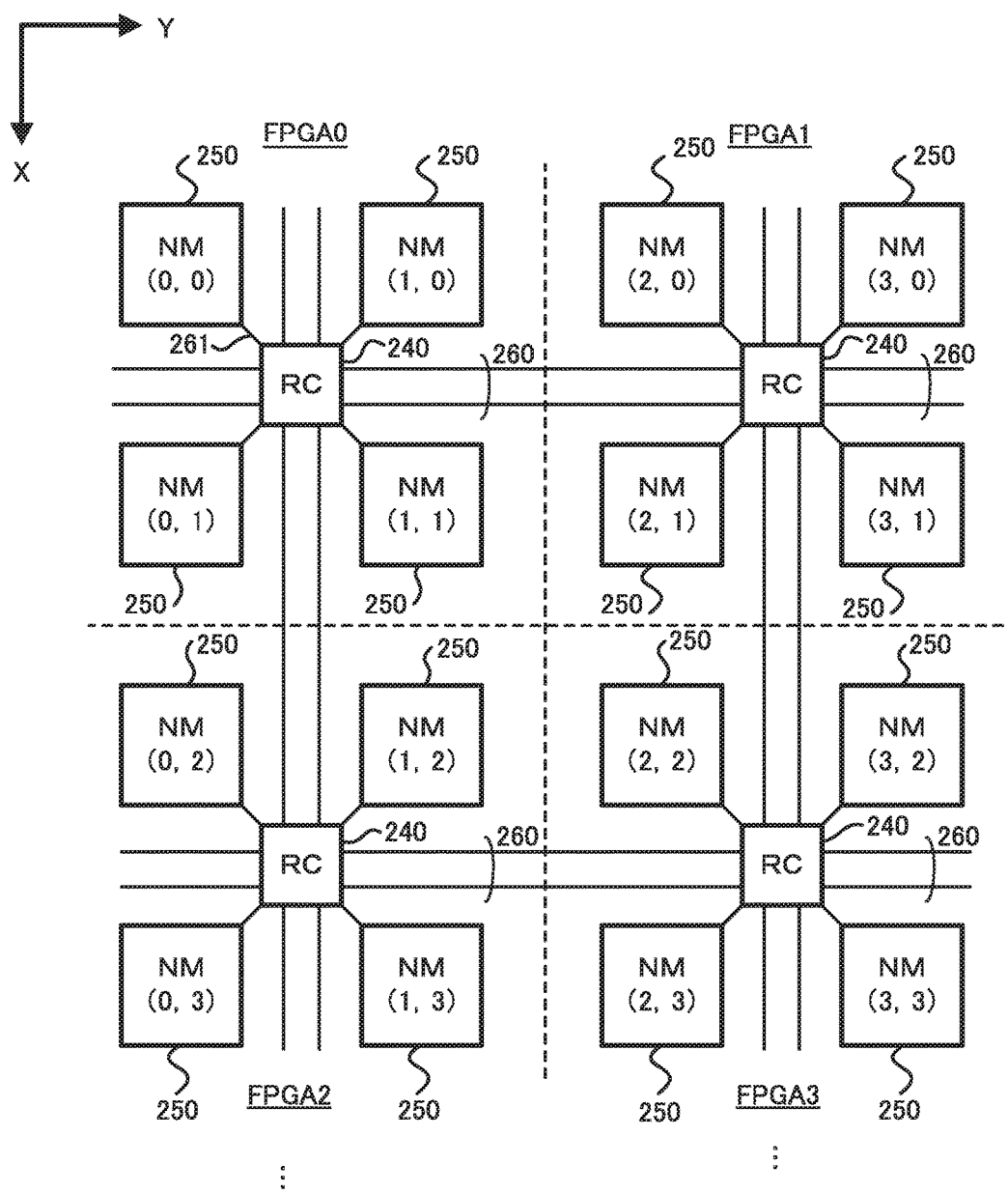
FIG. 4 shows a configuration of the storage unit according to the embodiment.

A detailed configuration of the storage 200 according to the present embodiment will be described below. FIG. 4 shows the configuration of the storage 200 according to the present embodiment.

The storage 200 includes a plurality of FPGAs, each including one routing circuit 240 and four node modules 250. The storage 200 shown in FIG. 4 has four field-programmable gate arrays FPGA0 to FPGA3. For example, FPGA0 includes one routing circuit 240 and the four node modules NM (0, 0), NM (1, 0), NM (0, 1), and NM (1, 1).

The addresses of the four field-programmable gate arrays FPGA0 to FPGA3 are, for example, (000, 000), (010, 000), (000, 010), and (010, 010) when expressed by binary notation.

Figure 5:
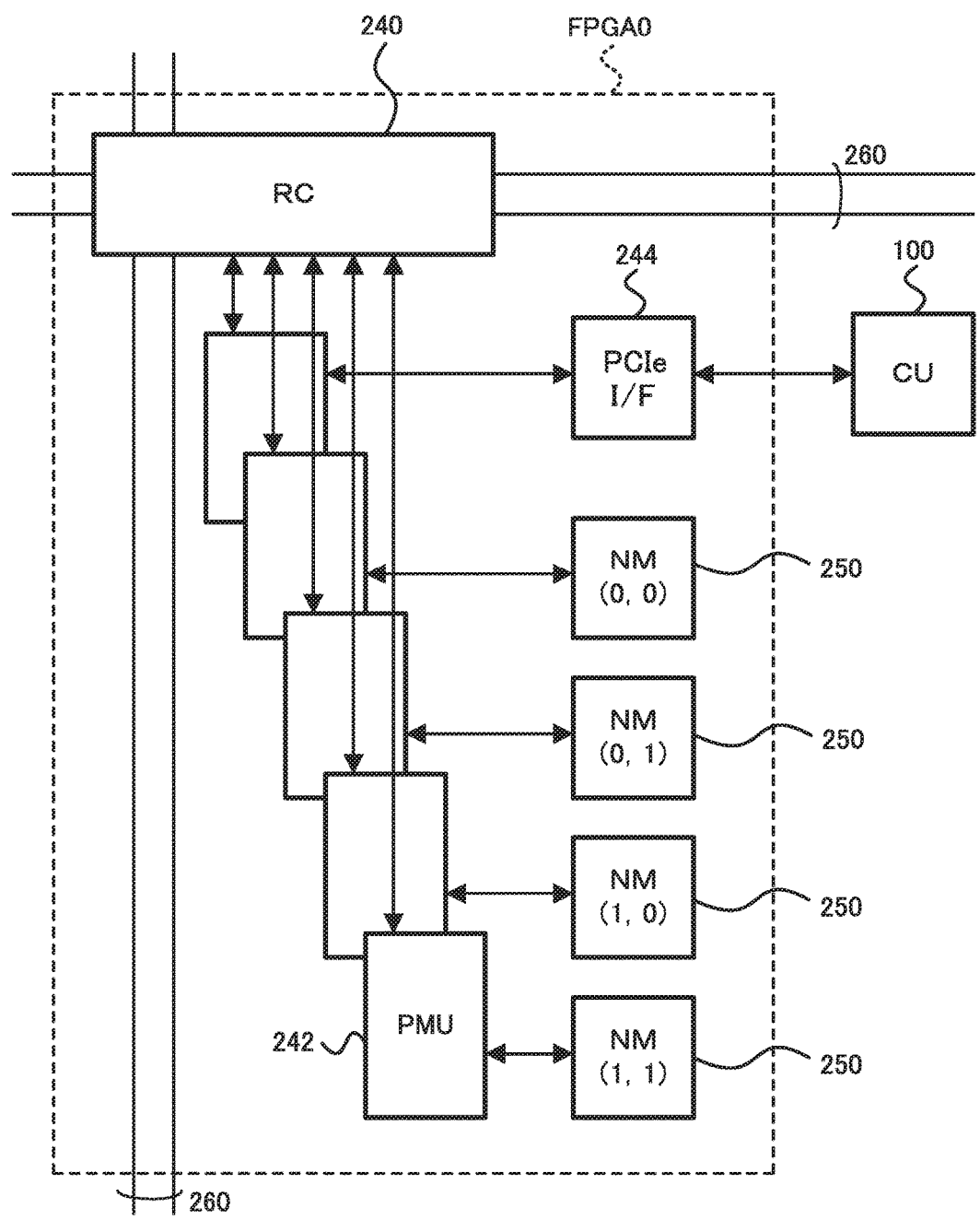
FIG. 5 shows a configuration of a field-programmable gate array (FPGA) in the storage unit.

The one routing circuit 240 and four node modules of each FPGA are electrically connected by interfaces 261 via a package management unit (PMU) 242 (shown in FIG. 5). In a data transfer operation, the routing circuit 240 performs routing, referring to address x and the address y of the FPGA address. The address x and the address y of the FPGA address are included in an instruction for writing to or reading from the storage 200, which was output from the database server 110. An instruction for writing to or reading from the storage 200 is issued in a data format that encompasses the address x and the address y of the FPGA address. The instructions include the request and an address of the storage 200.

(FPGA)

FPGAs according to the present embodiment will be described below. FIG. 5 shows the configuration of an FGPA of the embodiment. FPGA0 shown in FIG. 4 is representatively described below, and the configuration of FGPA1 to 3 is the same as FPGA0.

FPGA0 includes one routing circuit 240 and, for example, four node modules 250, five packet management units (PMUs) 242, and a connection unit interface (PCIe interface) 244.

Each of the packet management units 242 is provided to correspond to different one of the node modules 250 (and one PMU 242 is provided for communicating with the connection unit 100 through PCIe interface 244), and interprets packets transmitted by the connection unit 100 and the routing circuit 240. A packet management unit 242 judges whether or not the coordinates (relative node address) included in a packet coincide with its own coordinates (relative node address). When the coordinates coded in the packet coincide with its own coordinates, the packet management unit 242 transmits the packet directly to the node module 250 corresponding to the coordinates. In contrast, when the coordinates coded in the packet do not coincide with its own coordinates (that is, are other coordinates), the packet management unit 242 responds the non-match of the coordinates to the routing circuit 240.

For example, the ultimate node address of the target position is (3, 3), the packet management unit 242 connected to the node address (3, 3) judges that the interpreted coordinates (3, 3) coded in the packet coincide with its own address (3, 3). As a result, the packet management unit 242 connected to the node address (3, 3) transmits the interpreted packet to the node module 250 at the node address (3, 3) connected to itself. The transmitted packet is interpreted by a node controller (NC) 252 (see FIG. 6) of the node module 250. By doing this, the FPGA causes the node controller (NC) 252 to carry out prescribed processing based on a request in the packet such as stored, for example, in non-volatile memory within the node module 250.

The connection unit interface (PCIe interface) 244 interprets requests, packets, and the like from the connection unit 100. The connection unit interface 244 transmits the interpreted requests, packets, and the like to the packet management unit 242. Transmitted packets are transferred to another node module 250 via the routing circuit 240.

(Node Module (NM))

Figures 6, 7:
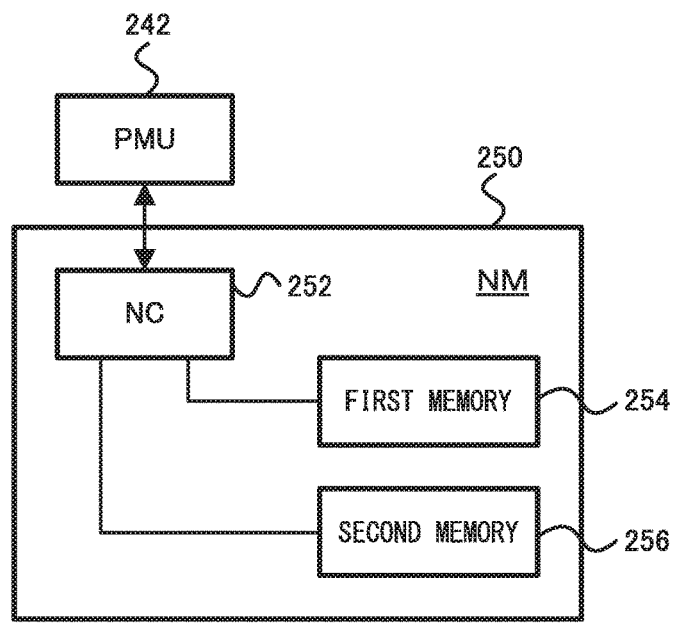
FIG. 6 shows a configuration of a node module (NM) in the FPGA.
FIG. 7 shows a configuration of a packet generated in the storage system according to the embodiment.

The node module 250 according to the present embodiment will be described below. FIG. 6 shows the configuration of the node module 250. Although the node module NM (0, 0) 250 shown in FIG. 6 is described below, configurations of the other node modules 250 are the same as that of the node module NM (0, 0) 250.

The node module NM (0, 0) 250 includes a node controller (NC) 252, a first memory 254 functioning as a storage memory, and a second memory 256 used by the node controller 252 as a working area.

The packet management unit 242 is electrically connected to the node controller 252. The node controller 252 receives packets, via the packet management unit 242, from the connection unit 100 or another node module 250 and transmits packets, via the packet management unit 242, to the connection unit 100 or another node module 250. When a packet address is its own node module 250, the node controller 252 executes processing corresponding to the packet (a command coded in the packet). For example, when the command is an access command (a read command or a write command), the node controller 252 accesses the first memory 254. When the address of the received packet is not its own node module 250, the node controller 252 transfers the packet to another node module 250.

A NAND-type flash memory (hereinafter, NAND memory), a bit cost scalable (BiCS) memory, a magnetoresistive memory (MRAM), a phase-change memory (PcRAM), a resistance random-access memory (RRAM®), or a combination thereof can be used as the first memory 254.

Various types of RAM, such as a DRAM (dynamic random-access memory) can be used as the second memory 256. When the first memory 254 functions as a working area, the second memory 256 need not be provided in the node module 250.

In general, the first memory 254 is non-volatile memory and the second memory 256 is volatile memory. Further, in one embodiment, the read/write performance of the second memory 256 is better than that of the first memory 254.

(Packet Configuration)

The packets generated in the storage system 1 according to the present embodiment are described below. FIG. 7 shows content of the packet according to the present embodiment.

The packet transmitted or received in the storage system 1 of the embodiment includes a header area HA, a payload area PA, and a redundancy area RA.

The header area HA contains, for example, the X-direction and Y-direction addresses (from_x, from_y) of the transmission source and the X-direction and Y-direction addresses (to_x, to_y) of the transmission destination.

The payload area PA contains, for example, a command and data or the like. The data size of the payload area PA is variable.

The redundancy area RA contains, for example, a CRC (cyclic redundancy check) code. The CRC code is a code (information) used to detect data errors in the payload area PA.

Upon receiving a packet having such contents, the routing circuit 240 determines the routing destination, based on a prescribed transfer algorithm. In accordance with the transfer algorithm, the packet is transferred between routing circuits 240 and ultimately reaches the node module 250 of the destination node address.

For example, the routing circuit 240, in accordance with the transfer algorithm, selects, as a transfer destination node module 250, a node module 250 located on a path that requires the minimum number of transfers from its own node module 250 to the address node module 250. When there is a plurality of paths that requires the minimum number of transfers from its own node module 250 to the address node module 250, the routing circuit 240 selects one of the paths, arbitrarily. In the same manner, when a node module 250 along the path that requires the minimum number of transfers has a defect or is busy, the routing circuit 240 selects a different node module 250 as the transfer destination.

In the storage 200, a plurality of node modules 250 is mutually connected to each other in a mesh network configuration. For this reason, there may be a plurality of paths that require the minimum number of packet transfers in the storage 200. In such cases, even if a plurality of packets are directed from a specific node module 250 to another specific node module 250, the plurality of output packets is distributed to a plurality of paths in accordance with the transfer algorithm. This distribution avoids concentration of accesses to a specific node module 250 along a path and suppresses reduction in the overall throughput of the storage system 1.

(Connection Unit)

Figure 8:
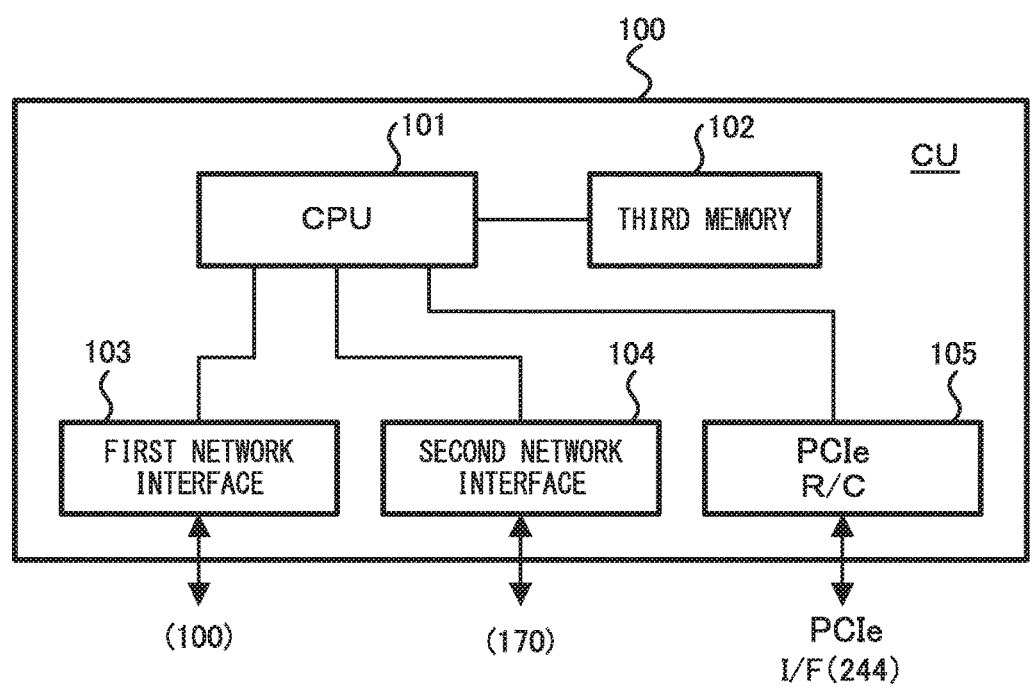
FIG. 8 shows a configuration of a connection unit (CU) of the embodiment.

FIG. 8 shows the configuration of the connection unit 100 according to the embodiment. The connection unit 100 includes a CPU (central processing unit) 101, a third memory 102, a first network interface 103, and a second network interface 104.

Upon receiving a request (command, address, and the like) transmitted by the client 300 via a connector connected to the client 300, the CPU (control circuit, processing circuit) 101 controls the storage 200. The CPU 101 executes a server application program, using the third memory 102 as a working area. The CPU 101 processes requests from outside, under the control of the server application program. When the CPU 101 accesses the storage 200, the CPU 101 generates a packet that can be transferred or executed by the routing circuit 240, and transmits the generated packet to the routing circuit 240 connected to its own connection unit 100.

The third memory 102 is used as the working area of the CPU 101. A volatile semiconductor memory such as DRAM, SRAM, or the like can be used as the third memory 102, although the configuration of the third memory 102 is not limited thereto.

(Backup Processing)

Backup processing carried out in the storage system 1 according to the present embodiment will be described. In the description below, the connection unit 100 operates to write the write data into the back up drive 220 as well as the database drive 210, when the connection unit 100 receives a write request during processing data with respect to the database drive 210.

The processing of the data with respect to the database drive 210 may include, but is not limited to, at least one of writing the data into the database drive 210 and reading the data from the database drive 210. The data may be data to be written into the database drive 210. The data may also be data which have been read out from the database drive 210. The data may also be data to be transmitted outside. The data may also be data subjected to processing prior to transmission of the processed data outside. The data may also be any data which have been processed or are in the process or to be processed with respect to the database drive 210.

If the database server 110 receives a request to write data into any one of the database drive 210 and back up drive 220 after the backup processing, the connection unit 100 writes the write data into the database drive 220 of the storage 200 without writing the write data into the back up drive 220.

Although the following will be a description of transmitting data to the backup destination as an example of data processing, the data processing is not limited thereto. The data processing may be reading of data stored in the database drive 210 and temporarily storing the data into another area of the database drive 210. A period from start to process the reading of data stored in the database drive 210 and transmission of the data to the backup destination until the completion thereof may not include data processing time, such as data writing time in the storage device of the backup destination (for example a device to write to a tape storage medium or device to write to a disk storage medium).

The start timing of processing the "reading of data stored in the database drive 210 and transmission of the data to the backup destination" may be the time at which the backup request is received, the time at which the readout of data is started, or the time at which the transmission of the read data is started. In the description below, the start timing is assumed to be the time at which the transmission of data is started.

The completion timing of the "reading of data stored in the database drive 210 and transmission of the data to the backup destination" may be the time at which the reading of data for backup is completed, the time at which the transmission of the data for backup is completed, or the time at which a completion notification is transmitted to the client 300. In the description below, the completion timing is assumed to be the time at which the transmission of data for backup is completed.

(Flow of Data During Full Backup)

FIGS. 9-12 are block diagrams showing data flow during a full backup operation carried out in the storage system according to the embodiment.

Figure 9:
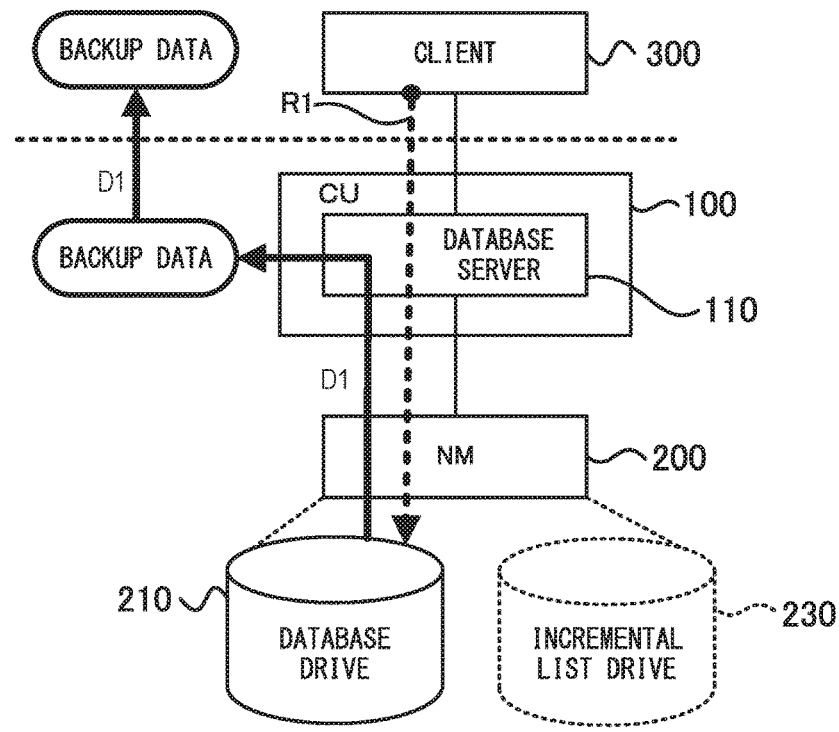
FIGS. 9-12 are block diagrams showing a flow of data during a full backup operation carried out in the storage system according to the embodiment.

The client 300, as shown in FIG. 9, transmits a backup request R1 to the connection unit 100. The connection unit 100 reads data to be backed up from the database drive 210 and transmits the read data as backup data D1 to the client 300. The backup data D1 are data that are stored in the storage 200 and determined by the client 300 to be backed up to another storage device. When a backup request R1 is received and a record of an incremental list exists in the incremental list drive 230, the connection unit 100 deletes the record of the incremental list from the incremental list drive 230. The record, as used here, is one unit of data stored in the list. Although the incremental list is not used in a full backup operation, the examples in FIG. 9 to FIG. 12 shows processing of updating the incremental list even during the full backup operation, in consideration of the case in which an incremental backup operation is performed after the full backup operation.

Figure 10:
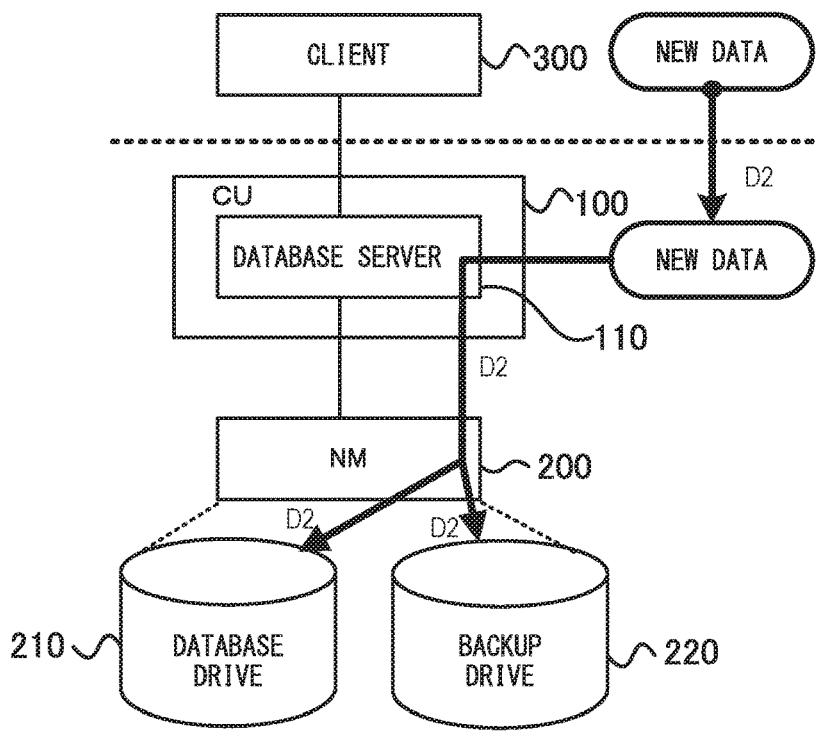

When a write request is generated during transmission of the backup data D1, the client 300, as shown in FIG. 10, transmits the write request, including new write data (new data) D2 therein, to the connection unit 100. The connection unit 100 writes the write data D2 in parallel to the database drive 210 and the backup drive 220. At the same time, in the connection unit 100, the log manager 116 generates a transaction log 116 for the operation to write the write data D2 to the database drive 210, and writes the transaction log into the log storage 210a. This enables the connection unit 100 to identify write data D2 generated during the backup processing into the backup drive 220.

Figure 11:
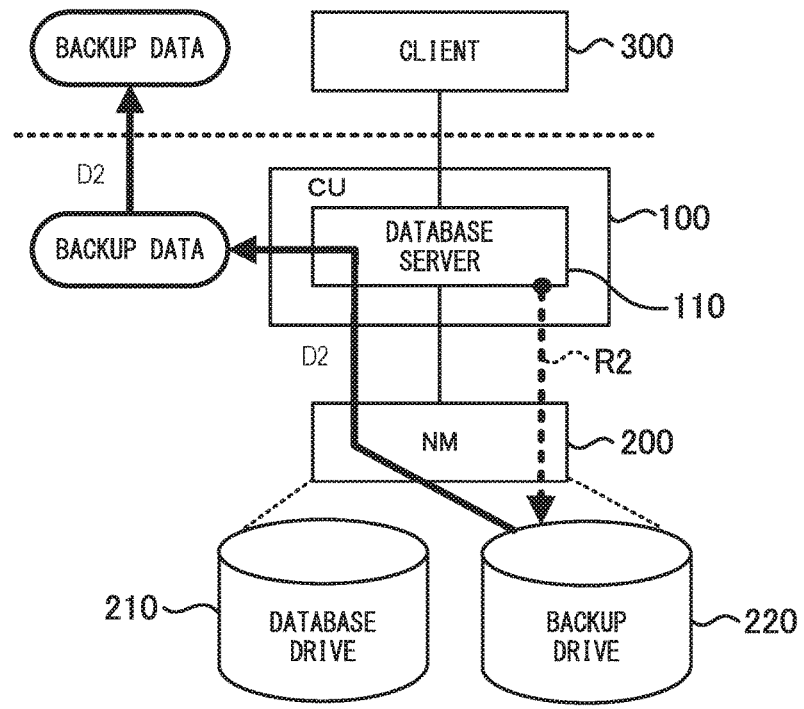

After completion of the operation to write the write data D2, the connection unit 100, as shown in FIG. 11, outputs a read request R2 to the storage 200, reads the write data D2 from the backup drive 220, and transmits the write data D2, as data to be added to the backup data D1, to the client 300. That is, the connection unit 100 causes backup of the write data D2 generated during the backup processing.

Figure 12:
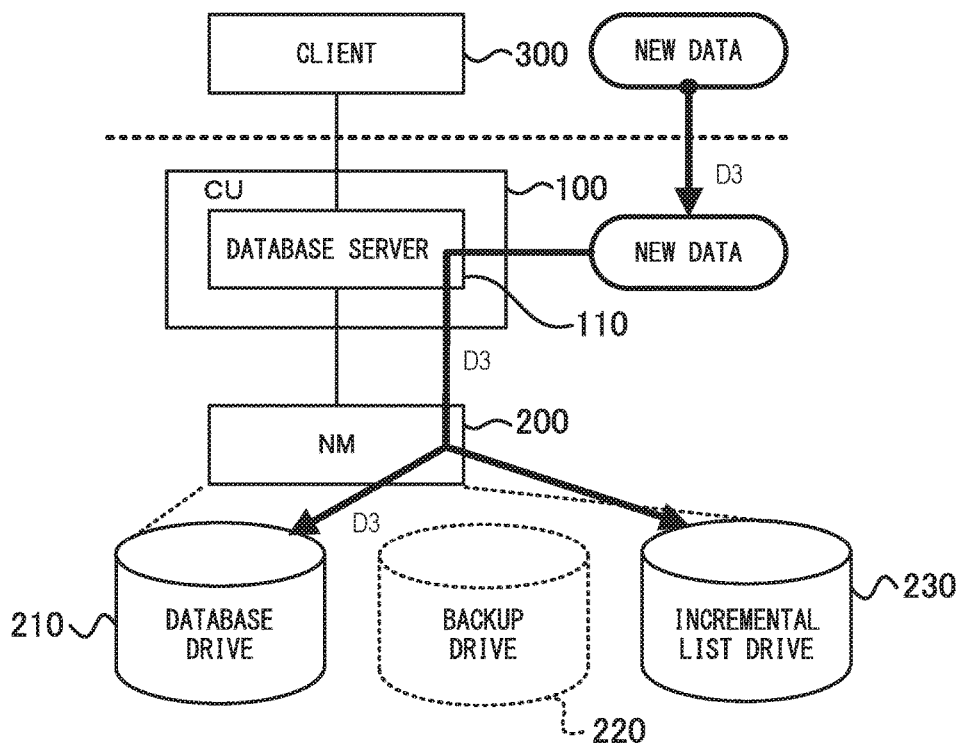

After completion of the backup processing, if the client 300, as shown in FIG. 12, transmits write data (new data) D3 to the connection unit 100, the connection unit 100 writes the write data D3 to the database drive 210. Also, the connection unit 100 deletes the write data D2 stored in the backup drive 220. The connection unit 100 stores into the incremental list drive 230 an incremental list regarding the write data D3 stored in the database drive 210.

(Flow of Data During Incremental Backup)

FIGS. 13-16 are block diagrams showing the flow of data during an incremental backup operation carried out in the storage system 1 according to the present embodiment.

Figure 13:
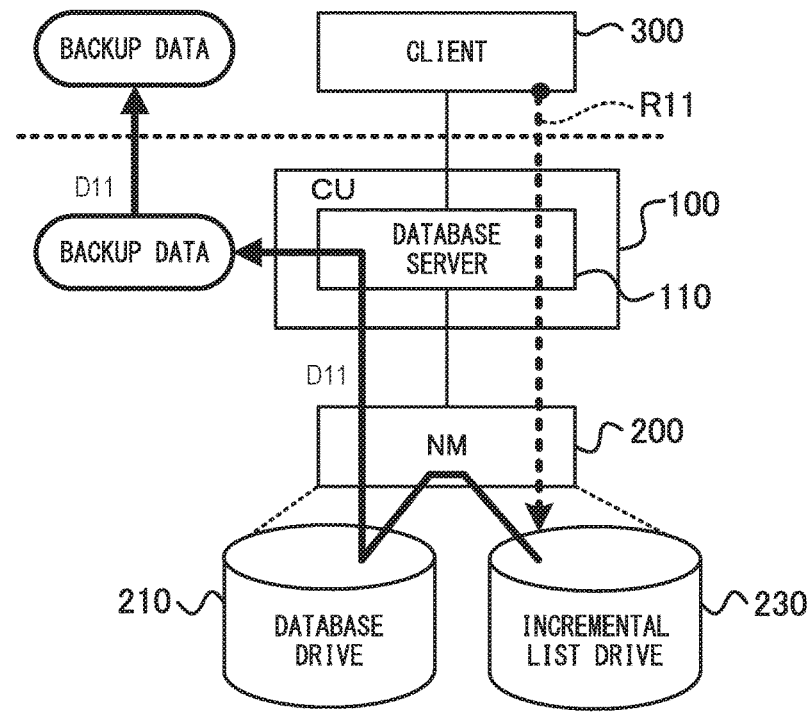
FIGS. 13-16 are block diagrams showing a flow of data during an incremental backup operation carried out in the storage system of the embodiment.

The client 300, as shown in FIG. 13, transmits a backup request R11 for an incremental backup operation to the connection unit 100. When the backup request R11 is received, the connection unit 100 reads out an incremental list of differential data stored in the incremental list drive 230. The incremental list of differential data is, for example, a list of keys corresponding to data to be added or deleted after completion of the previous full backup operation, and a list of keys corresponding to data to be added or deleted after completion of the previous incremental backup operation. The connection unit 100 reads from the database drive 210 data corresponding to the keys coded in the incremental list. The connection unit 100 transmits the read data, as backup data D11, to the client 300.

Figure 14:
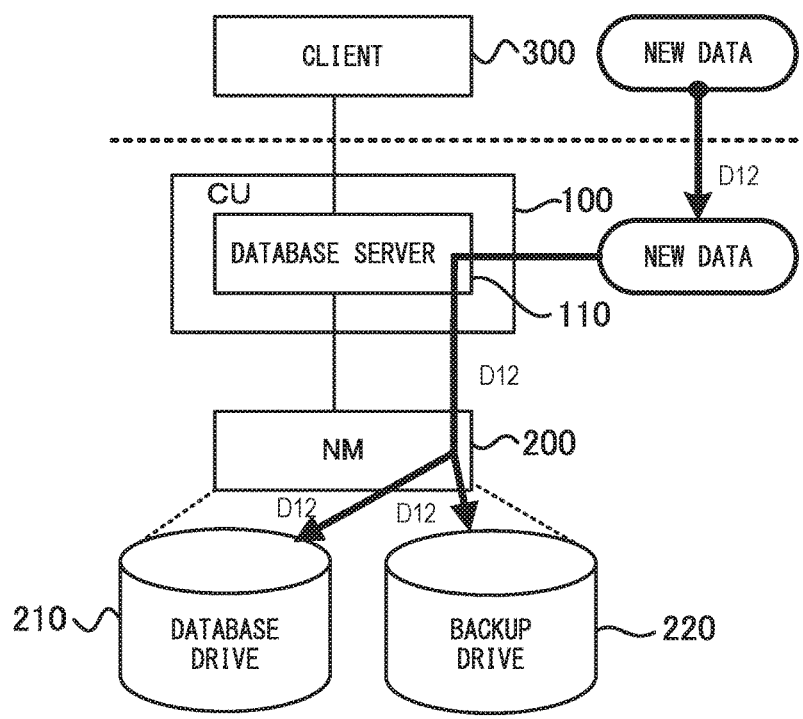

When a write request is generated by the client 300 during transmission of the backup data D11 to the client 300, the client 300, as shown in FIG. 14, transmits new write data (new data) D12, including the write request, to the connection unit 100. The connection unit 100 receives the write request, and writes the write data D12 in parallel into the database drive 210 and the backup drive 220. Also, in the connection unit 100, the log manager 116 generates a transaction log of the write data D12 written into the database drive 210 and writes the transaction log into the log storage 210a. As a result, the connection unit 100 can identify the write data D12 generated during the backup processing of the backup data D11 into the backup drive 220.

Figure 15:
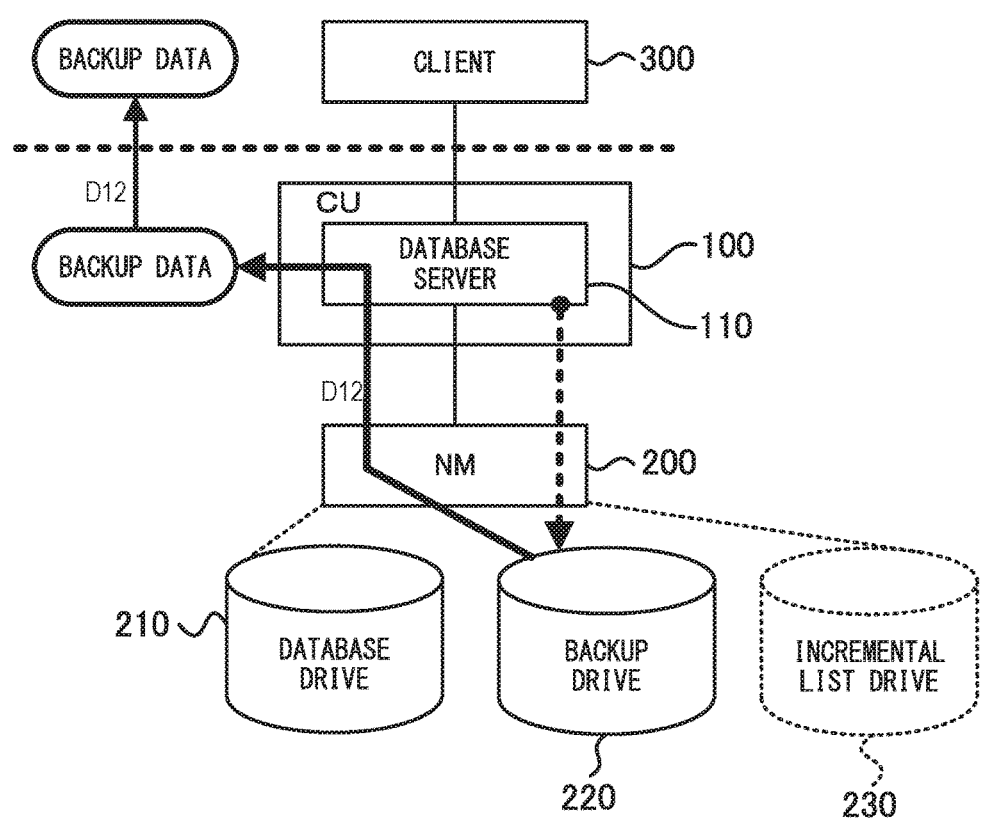

After completion of the writing of the write data D12, the connection unit 100, as shown in FIG. 15, outputs a read request R12 to the storage 200, reads the write data D12 from the backup drive 220, and transmits the write data D12 to the client 300, as data to be added to the backup data D11. That is, the connection unit 100 backs up the write data D12 generated during the backup processing.

Figure 16:
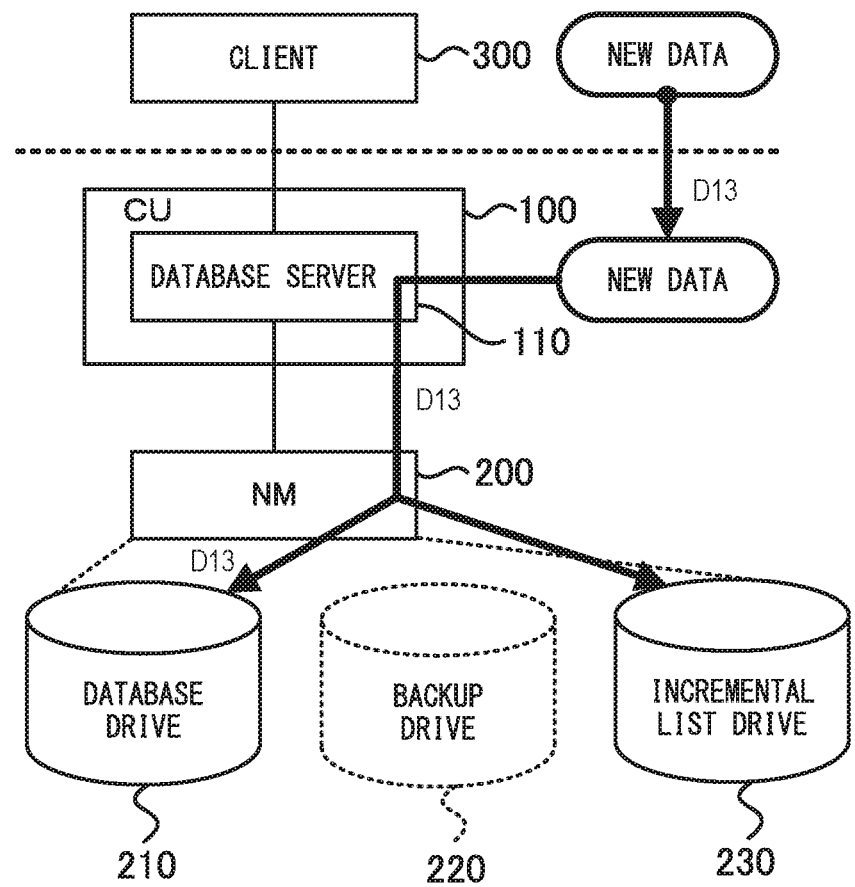

When the client 300, as shown in FIG. 16, transmits write data (new data) D13 to the connection unit 100, the connection unit 100 writes the write data D13 into the database drive 210. Also, the connection unit 100 deletes the write data D12 stored in the backup drive 220. Further, the connection unit 100 stores in the incremental list drive 230 an incremental list regarding the write data D13 stored in the database drive 210.

(Internal Processing in the Connection Unit During Backup Processing)

Figure 17:
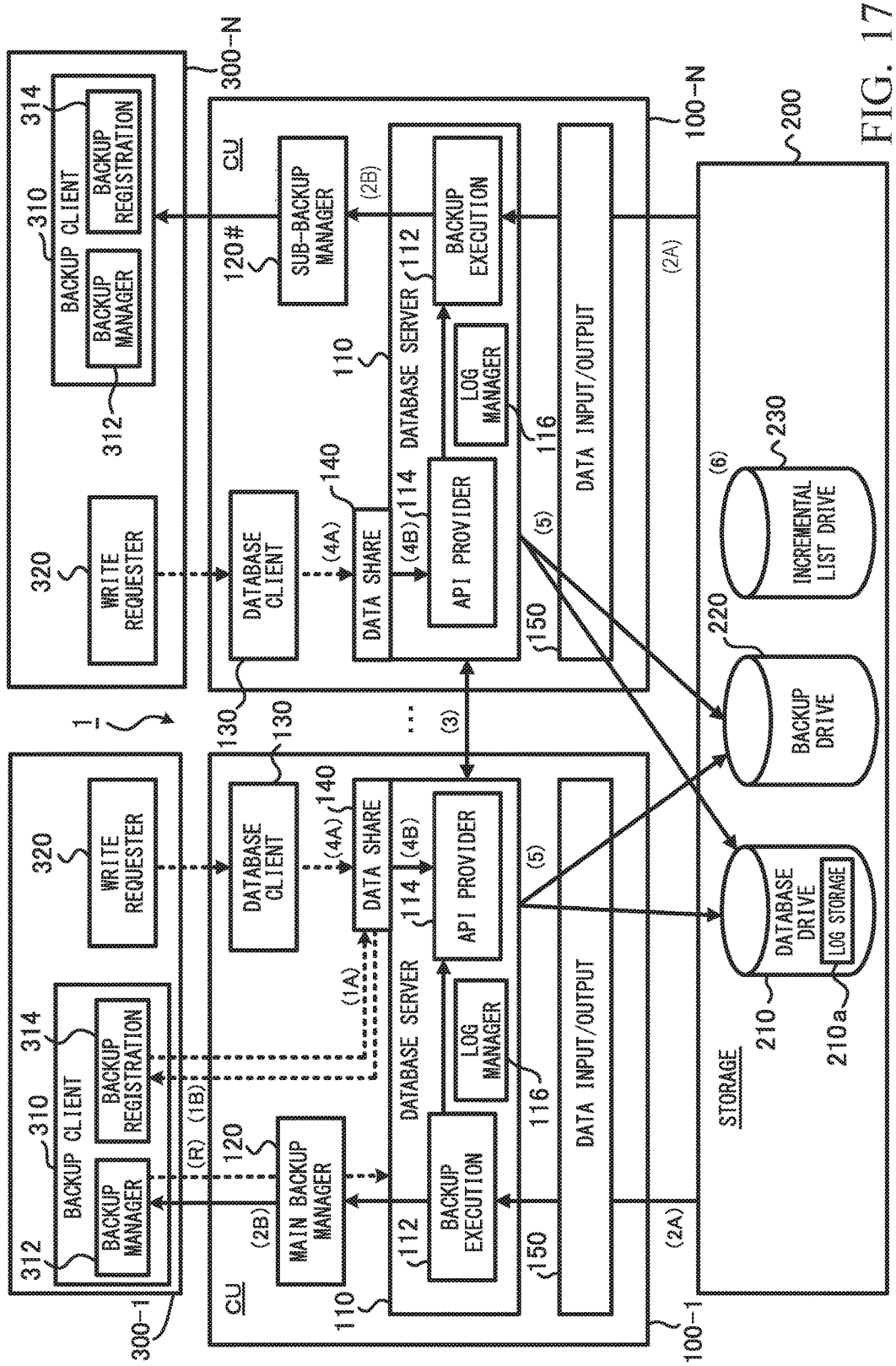
FIG. 17 illustrates an operation carried out in the connection unit according to the embodiment.

The internal processing carried out in the connection unit 100 while the storage system 1 of the present embodiment performs backup processing will be described. FIG. 17 describes the operation carried out in the connection unit 100 of the present embodiment.

As pre-processing for the backup processing, the backup registration 314 transmits, to the connection unit 100, the number of backup clients 310 and the type of backup processing set by the backup clients 310 ((1A) in FIG. 17). The number of backup clients 310 and the type of the backup processing for each of the backup clients 310 are stored in the data sharing unit 140. When backup processing is being performed, the data sharing unit 140 transmits to the backup registration 314 progress level of the backup processing and the response result with respect to the backup request ((1B) in FIG. 17). The progress level of the backup processing is, for example, a proportion of an amount of data that have been transmitted from the connection unit 100 to the client 300 with respect to an amount of the data to be backed up. The response result with respect to the backup request is, for example, information indicating the start or end of the backup processing.

When a backup request (R) has been sent from the backup manager 312, the connection unit 100 reads out from the database server 110 the data to be backed up that are stored in the database drive 210 ((2A) in FIG. 17). The database server 110 transmits the data to be backed up to the main backup manager 120 as backup data. The main backup manager 120, for example, compresses the backup data transmitted by the database server 110 into compressed data. The main backup manager 120 transmits, as backup data, the compressed data, to which the size of the compressed data, a header, the address, and the like have been added, to the backup manager 312 ((2B) in FIG. 17). In the same manner, the sub-backup manager 120# of the connection unit 100N transmits, as backup data, the compressed data, to which the size of the compressed data, a header, the address, and the like have been added, to the backup manager 312 ((2A) and (2B) in FIG. 17).

When a plurality of connection units 100 and a plurality of clients 300 are connected to a single storage 200, the main backup manager 120 and the sub-backup manager 120# recognize, the data to be backed up thereby, among data stored in the backup client 310 and the database drive 210 connected to itself. To perform this process, the main backup manager 120, by communicating with the database server 110, transmits a backup plan to the sub-backup manager 120# ((3) in FIG. 17). The backup plan includes client information such as the IP address and a port number of the backup client 310, and a table list within the storage 200 that the main backup manager 120 and the sub-backup manager 120# use. The table list is a list of information identifying the write data stored in the database drive 210, divided into a table based on a rule regarding categories or the like.

When a backup request (R) has been transmitted, the main backup manager 120 and the sub-backup manager 120#, in accordance with the backup plan, read out data included in the table that they themselves use and transmit the read-out data to the backup client 310 connected thereto ((2B) in FIG. 17).

When a write request is generated by the write requester 320 with respect to the data stored in the database drive 210 during the backup processing, the database client 130 transmits the write data to the data sharing unit 140 ((4A) in FIG. 17). When the data sharing unit 140 receives write data, the data sharing unit 140 provides the write data to the API provider 114. The backup status is passed from the backup client 310 to the API provider 114. The backup status includes, for example, a proportion of an amount of data that have been transmitted from the connection unit 100 to the client 300 with respect to an amount of the data to be backed up.

When write data have been provided, the database server 110 writes the write data in parallel into the database drive 210 and the backup drive 220 ((5) in FIG. 17). The database server 110 writes a transaction log into the database drive 210. As a result, the write data are written into both the database drive 210 and the backup drive 220.

After completion of the full backup operation, the database server 110 writes an incremental list regarding the write data into the incremental list drive 230 ((6) in FIG. 17).

Through the above processing, the storage system 1 can omit processing to write the write data generated during the backup processing into the database drive 210. As a result, it is possible avoid the delaying of processing with respect to write requests made to the database drive 210 during processing to perform the write process with respect to the database drive 210.

(Flow of Backup Processing)

Figure 18:
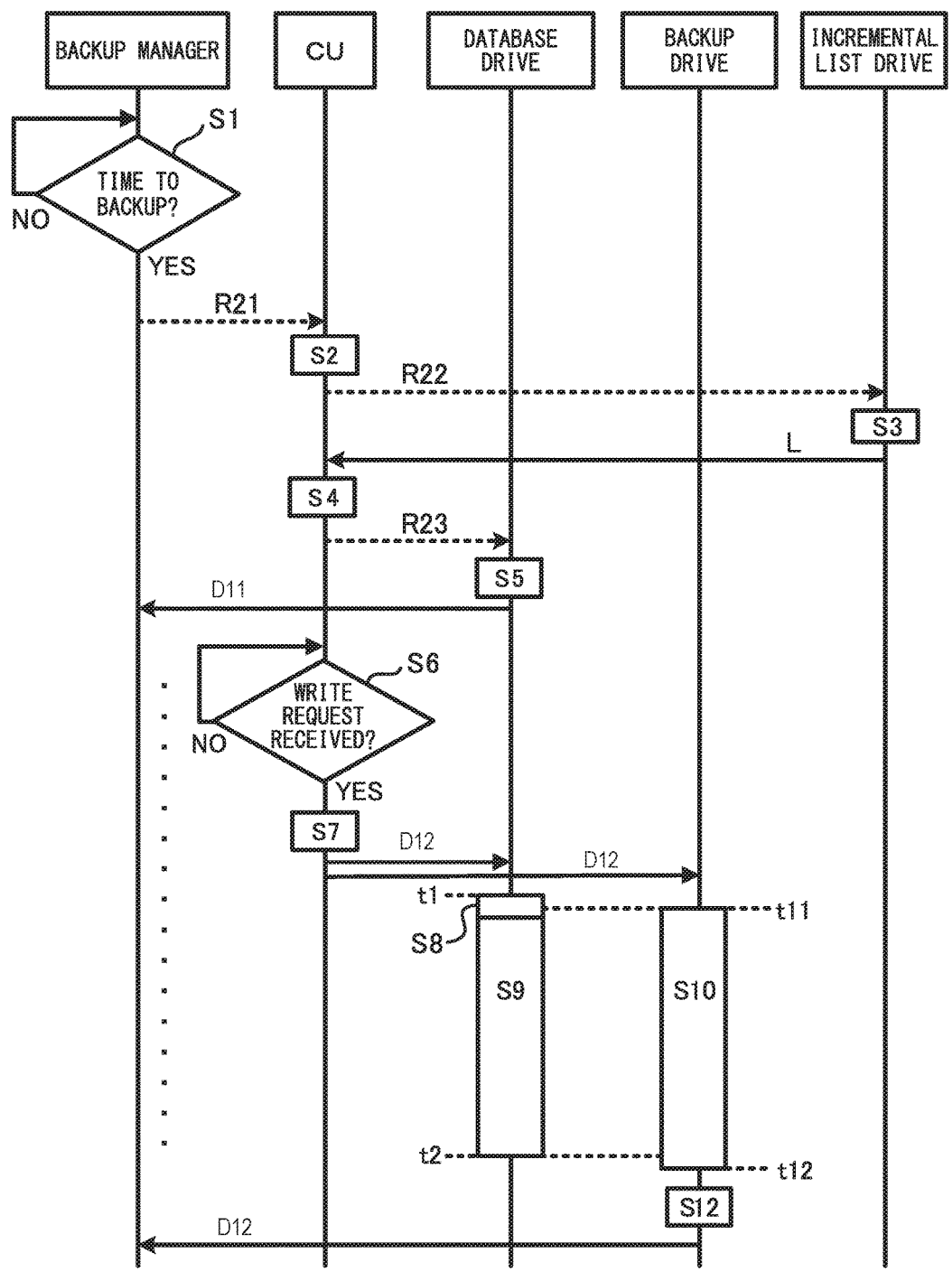
FIG. 18 is a sequence diagram showing a flow of backup processing carried out in the storage system according to the embodiment.

A flow of backup processing carried out in the storage system 1 according to the present embodiment will be described. FIG. 18 is a sequence diagram showing a flow of the backup processing carried out in the storage system according to the present embodiment. Specifically, FIG. 18 shows the flow of the incremental backup processing.

The backup manager 312 determines whether or not the timing to start the backup processing has reached (step S1). The backup manager 312 determines whether or not the timing to start the backup processing has reached according to a backup processing schedule or a user operation. If it is determined that the timing to start the backup processing has not reached (No in step S1), the backup manager 312 goes into a standby state. If the backup manager 312 determines that the timing to start the backup processing has arrived (Yes in step S1), a backup request R21 is transmitted to the connection unit 100. If the backup request R21 is transmitted by the backup manager 312, the connection unit 100 receives the backup request R21.

After the main backup manager 120 has received the backup request R21, the database server 110 outputs to the incremental list drive 230 a list request R22 to read out the incremental list stored in the incremental list drive 230 (step S2). In response to the list request R22, the incremental list drive 230 outputs the incremental list L to the database server 110 (step S3).

The database server 110 references the incremental list L and outputs to the database drive 210 a read request R23 to read out data to be backed up, which are stored in the database drive 210 (step S4). In response to the read request R23, the database drive 210 outputs to the database server 110 data D11 to be backed up (step S5). The database server 110 causes the main backup manager 120 to transmit the data D11 to be backed up from the database drive 210 to the backup client 310 as backup data.

When the data to be backed up D11 are transmitted from the main backup manager 120 to the backup client 310, the database server 110 determines whether or not a write request has been received by the write requester 320 (step S6, accepter). If the write request has been and write data D12 have been received via the database client 130 and the data sharing unit 140, the database server 110 determines that a write request has been received (Yes in step S6). Then, the database server 110 outputs the write data D12 to the database drive 210 and the backup drive 220 so as to store the write data D12 in parallel (step S7).

The parallel storage of data means that a first time period of writing the write data D12 into the database drive 210 (step S9) and a second time period of writing the write date D12 into the backup drive 220 (step S10, t11 to t12) at least in part overlap. Here, the first time period is defined between start to completion of the writing of the write data D12 into the database drive 210, and the second time period is defined between start to completion of the writing of the write data D12 into the backup drive 220. During the overlapped time period of the period of writing write data D12 to the database drive 210 and the period of writing to the backup drive 220, the database server 110 performs time-division switching between processing to write the write data D12 to the database drive 210 and processing to write the write data D12 to the backup drive 220, so as to store the write data D12 in parallel into the database drive 210 and the backup drive 220 (step S9 and step S10). Additionally, the database server 110 performs control processing so that a processing clock frequency for writing the write data D12 to the database drive 210 is higher than a processing clock frequency for writing the write data D12 to the backup drive 220. By doing this, the database server 110 performs control, so that time t2, at which the processing to write the write data D12 to the database drive 210 is completed comes earlier than time t12, at which the processing to write the write data D12 to the backup drive 220 is completed. The database server 110 may include a distributed configuration such as a multicore configuration including a first writing processor and a second writing processor. In this case, the first and second writing processors may execute independently of each other processing to write the write data D12 into the database drive 210 and processing to write the write data D12 into the backup drive 220, respectively, during the overlapped time period.

When writing the write data D12 and the transaction log to the database drive 210, the database server 110 writes the write data D12 to the database drive 210 subsequent to writing the transaction log to the database drive 210 (step S8). The transaction log is logs of the write data D12 written thereafter. As a result, the transaction log and the write data D12 written thereafter are stored as a pair of corresponding information. Then, the database server 110 sets timing to start the writing of the transaction log to the database drive 210 (t1) before timing to start the writing of the write data D12 into the backup drive 220 (t11). The database server 110 writes the write data D12 into the backup drive 220 without writing the transaction log.

That is, the writing of the transaction log into the database drive 210 completes before the writing of the write data D12 into the database drive 210 and the writing of the transaction log into the backup drive 220. As a result, even when the processing to write the transaction log is interrupted, the database server 110 can prevent the write data D12 being written into the backup drive 220 without the corresponding transaction log.

The database server 110 sets the timing (t1) to start the writing of the transaction log and the write data D12 into the database drive 210 and the timing (t11) to start the writing of the write data D12 into the backup drive 220, so that the timing (t2) to complete the writing of the write data D12 into the database drive 210 comes before the timing (t12) to complete the writing of the write data D12 into the backup drive 220. Alternatively, the database server 110 may adjust the schedule of time-division writing, so that the timing (t2) comes before the timing (t12).

Through this operation, the database drive 210 completes to store the write data before the backup drive 220 does. As a result, the storage system 1 can promptly respond to the next write request.

The database server 110, after writing the write data D12 in parallel into the database drive 210 and the backup drive 220, reads out the write data D12 in the backup drive 220 and transmits the write data D12 to the backup client 310 as backup data (step S12).

FIG. 18 shows a flow of the incremental backup processing. In the case of carrying out the full backup processing, the steps of S2 and S3 can be omitted. In this case, at step S4, the database server 110 outputs to the database drive 210 a request R23 to read the data to be backed up, which are stored in the entire database drive 210.

Figure 19:
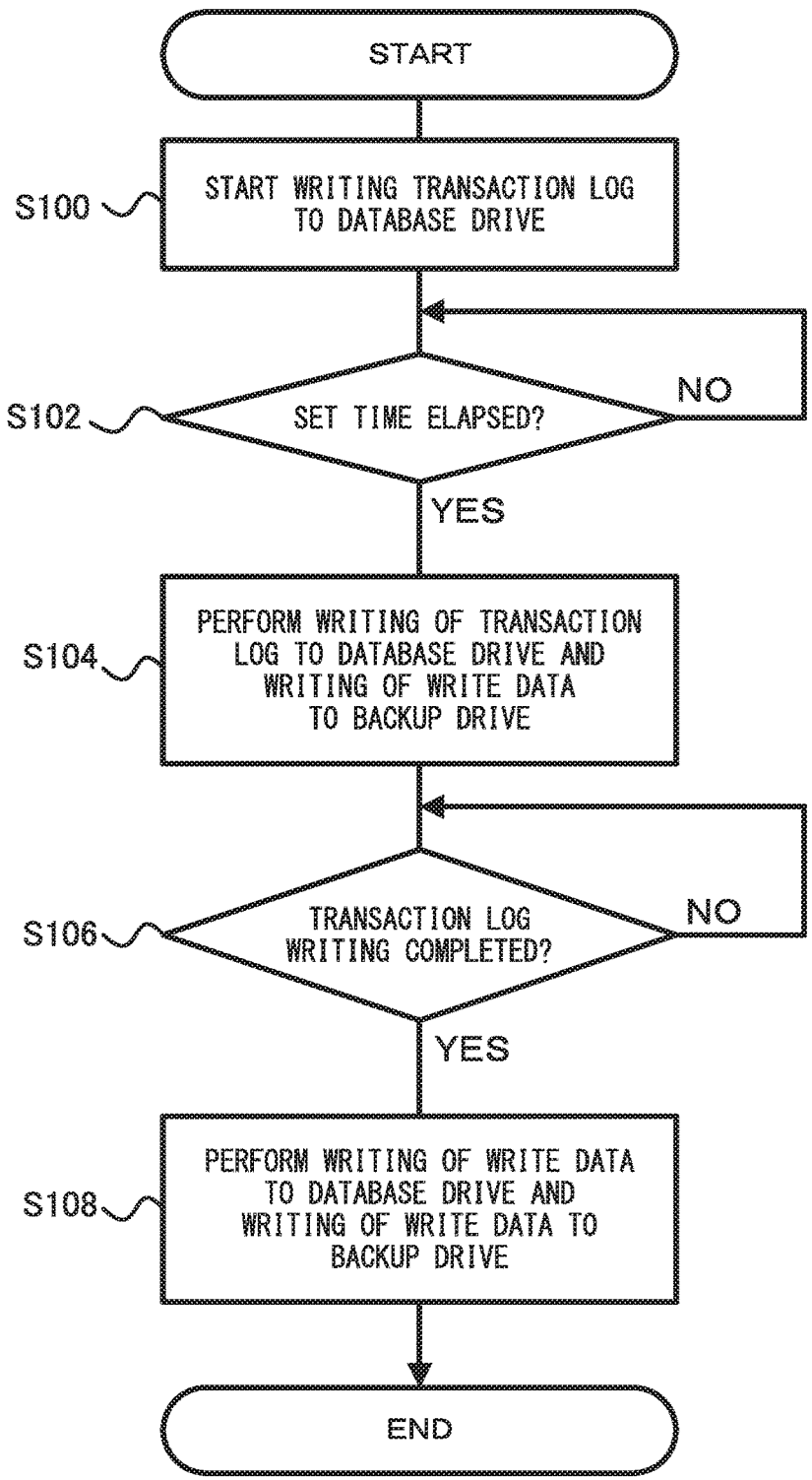
FIG. 19 is a flowchart showing a flow of processing to write data into the database drive and the backup drive in parallel.

FIG. 19 is a flowchart showing a flow of processing to write the write data D12 in parallel into the database drive 210 and the backup drive 220. The processing shown in FIG. 19 is performed between time t1 and time t12 in FIG. 18.

First, the database server 110 starts writing the transaction log to the database drive 210 (step S100). Next, the database server 110 waits for elapse of a set amount of time (step S102). The writing of the transaction log into the database drive 210 continues even during the waiting period.

If the set amount of time has elapsed (Yes in step S102), the database server 110 writes the transaction log into the database drive 210 and the write data D12 into the backup drive 220 (step S104).

Next, the database server 110 waits for completion of the writing of the transaction log into the database drive 210 (step S106). The writing at step S104 continues even during the waiting period.

If the writing of the transaction log into the database drive 210 is completed (Yes in step S106), the database server 110 writes the write data D12 into the database drive 210 and writes the write data D12 into the backup drive 220 (step S108). When the processing of this step is completed, the processing to store the write data D12 in parallel into the database drive 210 and the backup drive 220 ends.

(Transaction Log)

Next, the transaction log, which is generated by the log manager 116 and stored in the log storage 210a of the database drive 210, will be described.

Figure 20:
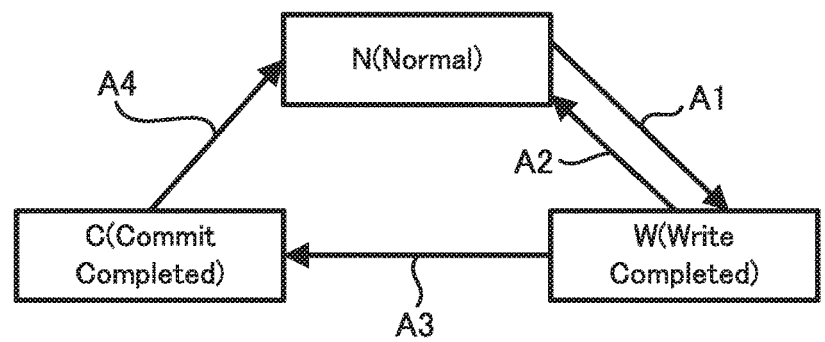
FIG. 20 illustrates transition of a data writing state in the storage system according to the embodiment.

FIG. 20 describes transition of data writing states in the storage system 1 according to the present embodiment. In the present embodiment, the three writing states are Normal (N state), Write Completed (W state), and Commit Completed (C state). The writing state is managed by the log manager 116 for each data to be backed up processed during the backup processing. The writing state is normally the N state, and when a request writing, updating, or deletion (A1) is made, the writing state transitions to the W state (Write Completed). The writing state transitions from the W state to the N state by roll back (A2). Also, the writing state transitions from the W state to the C state by commitment (A3). Further, the writing state transitions from the C state to the N state at the roll forward update completion (A4).

Figure 21:
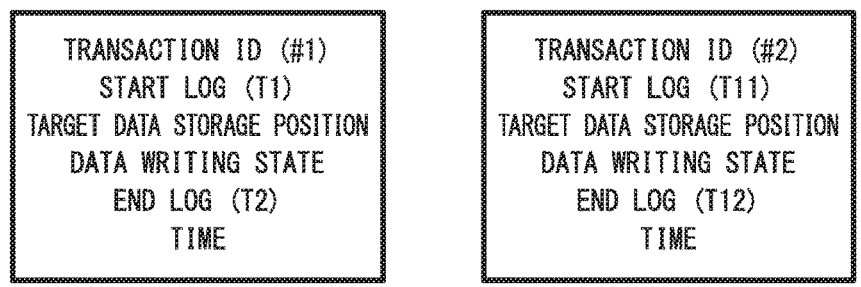
FIG. 21 shows an example of a transaction log generated in the storage system according to the embodiment.

FIG. 21 shows an example of a transaction log generated in the storage system according to the present embodiment. The transaction log includes a transaction ID, a start log, a target data storage position, a data writing state, an end log, and a time. The transaction log may include other information that identifies the transaction. The transaction ID is an identifier that uniquely identifies the transaction processing. The start log may indicate start of the transaction. The start log, for example, includes time at which a write request or a backup request is generated. The target data storage position is, for example, the physical or logical address in the storage 200 at which the target data are stored.

The data writing state is, for example, one of the N state, the W state, and the C state shown in FIG. 20. When the data writing state changes, the log manager 116 generates a new transaction log and writes the generated transaction log into the log storage unit 201a.

The left portion of FIG. 21 is an example of a transaction log corresponding to the processing (S9) to write into the database drive 210 shown in FIG. 18. This transaction log is written into the database drive 210 at step S8. This transaction log includes the transaction ID (#1) corresponding to the processing of writing the write data into the database drive 210, the time t2 as the start log, and the time t3 as the end log.

The right portion of FIG. 21 is an example of a transaction log corresponding to the processing to write into the backup drive 220 shown in FIG. 10. This transaction log includes a transaction ID (#2) corresponding to the processing of writing the write data into the backup drive 220, the time t11 as the start log, and the time t12 as the end log. This transaction log is written into the log storage unit 201a without being written into the backup drive 220.

Figure 22:
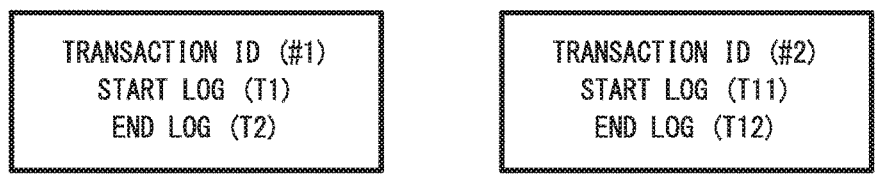
FIG. 22 shows another example of the transaction log generated in the storage system according to the embodiment.
Figure 23:
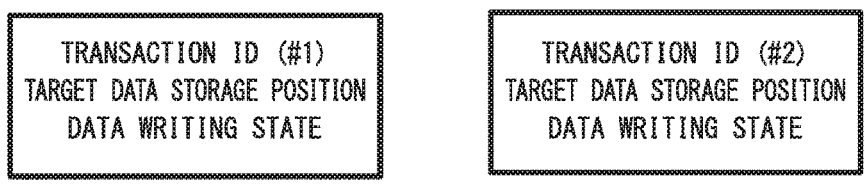
FIG. 23 shows still another example of the transaction log generated in the storage system according to the embodiment.

FIG. 22 and FIG. 23 show other examples of the transaction log generated in the storage system 1 according to the present embodiment. As shown in FIG. 22, the transaction log may include the transaction ID, the start log, and the end log. As shown in FIG. 23, the transaction log may include the transaction ID, the target data storage position, and the data writing state.

(Update of Backup Data)

Processing to cause the write data to be reflected in a table stored in the database drive 210 after completion of data backup into the backup drive 220, will now be described.

Figure 24:
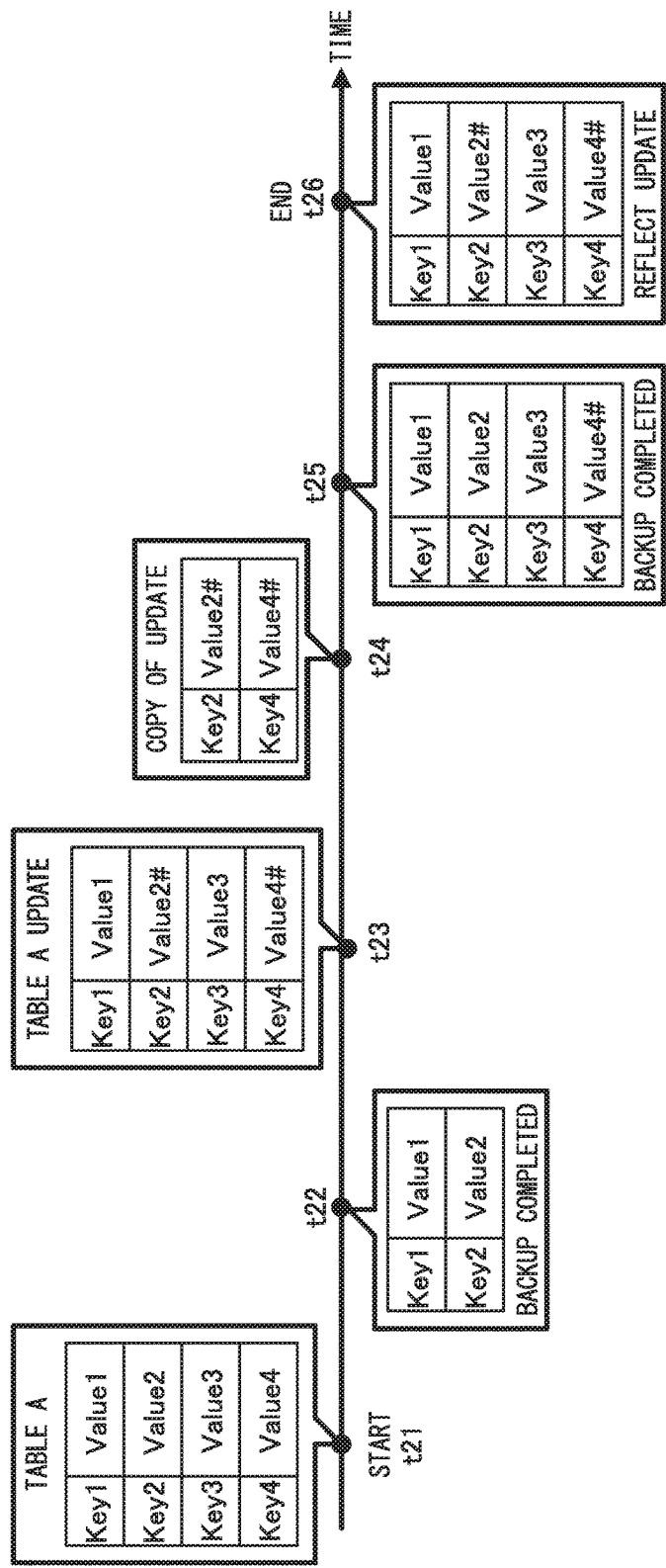
FIG. 24 illustrates a flow of backup processing carried out in the storage system according to the embodiment.

FIG. 24 illustrates another example of the flow of the backup processing carried out in the storage system of the present embodiment. FIG. 24 shows contents of a table stored in the storage 200 when the storage 200 functions as a key-value type database.

At the time to start the backup processing (time t21), the table A of the database drive 210 includes the keys 1 to 4 associated with values 1 to 4, respectively. The table A is read from the database drive 210 through the backup processing and the values 1 and 2 corresponding to the keys 1 and 2 are transmitted to the backup client 310 (time t22).

Here, it is assumed a write request to update the values 2 and 4 corresponding to the keys 2 and 4 in the table A of the database drive 210 to the values 2# and 4# is generated during the backup processing (time t23). The connection unit 100 of the present embodiment, by writing the write data (values 2# and 4#) in parallel to the database drive 210 and the backup drive 220, copies the updated part of data (values 2# and 4#) to the backup drive 220.

Then, the database server 110, by continuing the backup processing of the values 3 and 4 corresponding to the keys 3 and 4, transmits the values 1 to 3 and 4# corresponding to the keys 1 to 4 to the backup client 310, thereby completing the backup processing (time t25).

After the above, the database server 110 overwrites the updated part of the value 2# and the value 4# copied to the backup drive 220 over the values corresponding to the keys 2 and 4 in the database drive 210 (time t26).

As described above, the table A transmitted to the backup client 210 at time t25 does not reflect the updated portion, because the value 2 in the table A of the database drive 210 was updated to the value 2# after the backup processing of the value 1 and 2 was completed at time t22. In contrast, the database server 110 of the present embodiment, after the end of writing into the backup drive 220, can reflect the write data in the table A of the database drive 210 based on the write data stored in the backup drive 220. As a result, according to the storage system 1, even if the table A is updated during the backup processing, updated data can be reflected in the table A, thereby enabling data consistency between the table A during the backup processing and the table A after the backup processing.

Although the storage system 1 of the above embodiment, as shown in FIG. 3, has a routing circuit, a node module, and a connection unit and the like, the storage system 1 can have any configuration, as long as it is possible to write data into the database drive during the backup processing of the database drive.

According to one or more embodiments described above, when a request to write to the database drive 210 is generated while data are being stored in the database drive 210 (first area), there is no need to write the write data back to the database drive 210, because the database server 110 writes write data in parallel into the database drive 210 and the backup drive 220 (second area). According to the storage system 1 of the above embodiment, therefore, it is possible to avoid processing delay of updating the database drive 210, which may be caused by writing write data back to the database drive 210.

While certain embodiments have been described, these embodiments have been presented by way of example only, and are not intended to limit the scope of the inventions. Indeed, the novel embodiments described herein may be embodied in a variety of other forms, and various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A storage system, comprising:
a storage unit having a plurality of routing circuits electrically networked with each other, each of the routing circuits being locally connected to a plurality of node modules, each of which includes nonvolatile memory, the plurality of node modules forming at least first and second storage regions; and
a plurality of connection units, each connected to one or more of the routing circuits and configured to access the first and second storage regions through one or more of the routing circuits in accordance with a command, wherein
when one of the connection units receives a command to write second data into the first storage region while first data is being read out from the first storage region, said one of the connection units starts writing a log in the first storage region indicating a written status of the second data before writing the second data in parallel into the first and second storage regions.

2. The storage system according to claim 1, wherein the log is not written into the second storage region.

3. The storage system according to claim 1, wherein writing of the second data into the second storage region begins before writing of the second data into the first storage region.

4. The storage system according to claim 1, wherein the writing of the second data into the first storage region completes before the writing of the second data into the second storage region completes.

5. The storage system according to claim 1, wherein when a portion of the first data that has not been read out from the first storage region corresponds to a portion of the second data that has been already written into the first storage region, the portion of the second data written into the first storage region is read out instead of the portion of the first data.

6. The storage system according to claim 1, wherein said one of the connection units completes both the writing of the second data and the log into the first storage region before the writing of second data into the second storage region completes, then reads out the second data from the second storage region after the writing of the second data into the second storage region completes.

7. The storage system according to claim 1, wherein when said one of the connection units receives a command to write third data into the first storage region after the first data has been read out, the third data is written into the first storage region and not into the second storage region.

8. The storage system according to claim 7, wherein the plurality of node modules also forms a third storage region, and
an address or identification information of the third data is stored in the third storage region.

9. The storage system according to claim 1, wherein if first data is being read out from the first storage region in a backup processing of the first storage region and the command to write the second data in the first storage region is received during the backup processing, the second data is then read out from the second storage region in the backup processing after the first data has been read out from the first storage region.

10. The storage system according to claim 9, wherein the first data is all data stored in the first storage region.

11. The storage system according to claim 9, wherein the first data is only the portion of data stored in the first storage region not backed up.

12. The storage system according to claim 9, wherein after the second data is read out from the second storage region, the second data is erased from the second storage region.

13. A method for back up of data stored in a storage system, the storage system including:
a storage unit having a plurality of routing circuits electrically networked with each other, each of the routing circuits being locally connected to a plurality of node modules, each of which includes nonvolatile memory, the plurality of node modules forming at least first and second storage regions; and
a plurality of connection units, each connected to one or more of the routing circuits and configured to access the first and second storage regions through one or more of the routing circuits in accordance with a command, the method comprising:
reading out first data from the first storage region;
when one of the connection units receives a command to write second data into the first storage region while first data is being read out from the first storage region, starting a writing of a log in the first storage region, the log indicating a written status of the second data, then writing the second data in parallel into the first and second storage regions; and
when the first data is being read out from the first storage region in a backup processing of the first storage region, reading out the second data from the second storage region in the backup processing after the first data has been read out from the first storage region.

14. The method according to claim 13, wherein the first data is all data stored in the first storage region.

15. The method according to claim 13, wherein the first data is only the portion of data stored in the first storage region not yet backed up.

16. The method according to claim 13, further comprising:
erasing the second data in the second storage region after the second data is read out from the second storage region.

17. The method according to claim 13, wherein the log is not written into the second storage region.

18. The method according to claim 13, wherein the writing of the second data into the first storage region completes before the writing of the second data into the second storage region completes.

19. The method according to claim 13, wherein when a portion of the first data that has not been read out from the first storage region corresponds to a portion of the second data that has been already written into the first storage region, the portion of the second data written into the first storage region is read out instead of the portion of the first data.

20. The method according to claim 13, wherein said one of the connection units completes both the writing of the second data and the log into the first storage region before the writing of second data into the second storage region completes, then reads out the second data from the second storage region after the writing of the second data into the second storage region completes.

* * * * *